United States Patent
Grube et al.

(10) Patent No.: US 9,047,217 B2
(45) Date of Patent: *Jun. 2, 2015

(54) NESTED DISTRIBUTED STORAGE UNIT AND APPLICATIONS THEREOF

(75) Inventors: Gary W. Grube, Barrington Hills, IL (US); Timothy W. Markison, Lahaina, HI (US)

(73) Assignee: Cleversafe, Inc., Chicago, IL (US)

( * ) Notice: Subject to any disclaimer, the term of this patent is extended or adjusted under 35 U.S.C. 154(b) by 634 days.

This patent is subject to a terminal disclaimer.

(21) Appl. No.: 12/712,842

(22) Filed: Feb. 25, 2010

(65) Prior Publication Data

US 2011/0055662 A1  Mar. 3, 2011

Related U.S. Application Data

(60) Provisional application No. 61/237,652, filed on Aug. 27, 2009.

(51) Int. Cl.
*G06F 11/10* (2006.01)
*G06F 21/62* (2013.01)
*H04L 29/06* (2006.01)

(52) U.S. Cl.
CPC ........ *G06F 11/1092* (2013.01); *G06F 11/1008* (2013.01); *G06F 21/6272* (2013.01); *H04L 63/126* (2013.01)

(58) Field of Classification Search
CPC ............ G06F 11/1092; G06F 11/1008; G06F 21/6272
USPC ........... 714/6.2, 6.24, 6.22, 718–72; 711/127, 711/5, 114, 157; 365/200–201
See application file for complete search history.

(56) References Cited

U.S. PATENT DOCUMENTS

| 4,092,732 A | 5/1978 | Ouchi |
| 5,454,101 A | 9/1995 | Mackay et al. |
| 5,485,474 A | 1/1996 | Rabin |
| 5,758,050 A * | 5/1998 | Brady et al. ...................... 714/1 |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Steve Nguyen
(74) *Attorney, Agent, or Firm* — Garlick & Markison; Timothy W. Markison

(57) ABSTRACT

A method for execution by a DS storage unit begins with the DS storage unit receiving an encoded slice of a plurality of encoded slices, wherein the plurality of encoded slices was generated from a data segment using an error encoding function. The method continues with the DS storage unit determining whether the encoded slice is to be sub-sliced using a sub-slicing encoding function. The method continues with the DS storage unit generating a plurality of encoded sub-slices from the encoded slices using the encoded sub-slicing encoding function when the encoded slice is to be sub-sliced. The method continues with the DS storage unit outputting the plurality of encoded sub-slices to a plurality of DS storage units.

18 Claims, 15 Drawing Sheets

(56) References Cited

U.S. PATENT DOCUMENTS

| | | | |
|---|---|---|---|
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,556,476 B1 * | 4/2003 | Na | 365/185.04 |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,807,581 B1 * | 10/2004 | Starr et al. | 709/250 |
| 6,826,711 B2 | 11/2004 | Moulton et al. | |
| 6,879,596 B1 | 4/2005 | Dooply | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,352,622 B2 * | 4/2008 | Chiang et al. | 365/185.11 |
| 7,636,724 B2 | 12/2009 | de la Torre et al. | |
| 8,768,971 B2 * | 7/2014 | Apacible et al. | 707/802 |
| 2001/0044879 A1 * | 11/2001 | Moulton et al. | 711/114 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2004/0024963 A1 | 2/2004 | Talagala et al. | |
| 2004/0122917 A1 | 6/2004 | Menon et al. | |
| 2004/0128444 A1 * | 7/2004 | Baek et al. | 711/114 |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

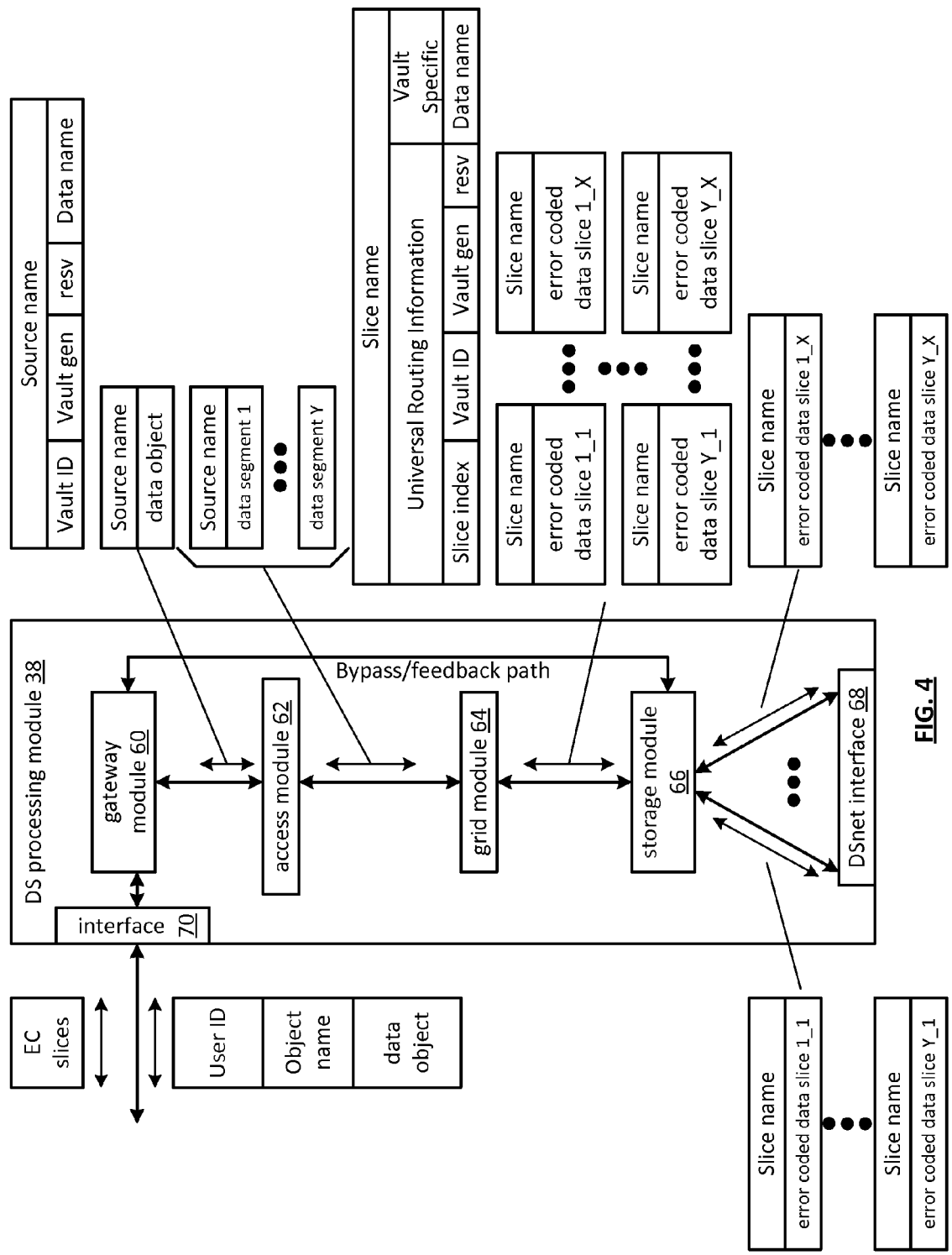

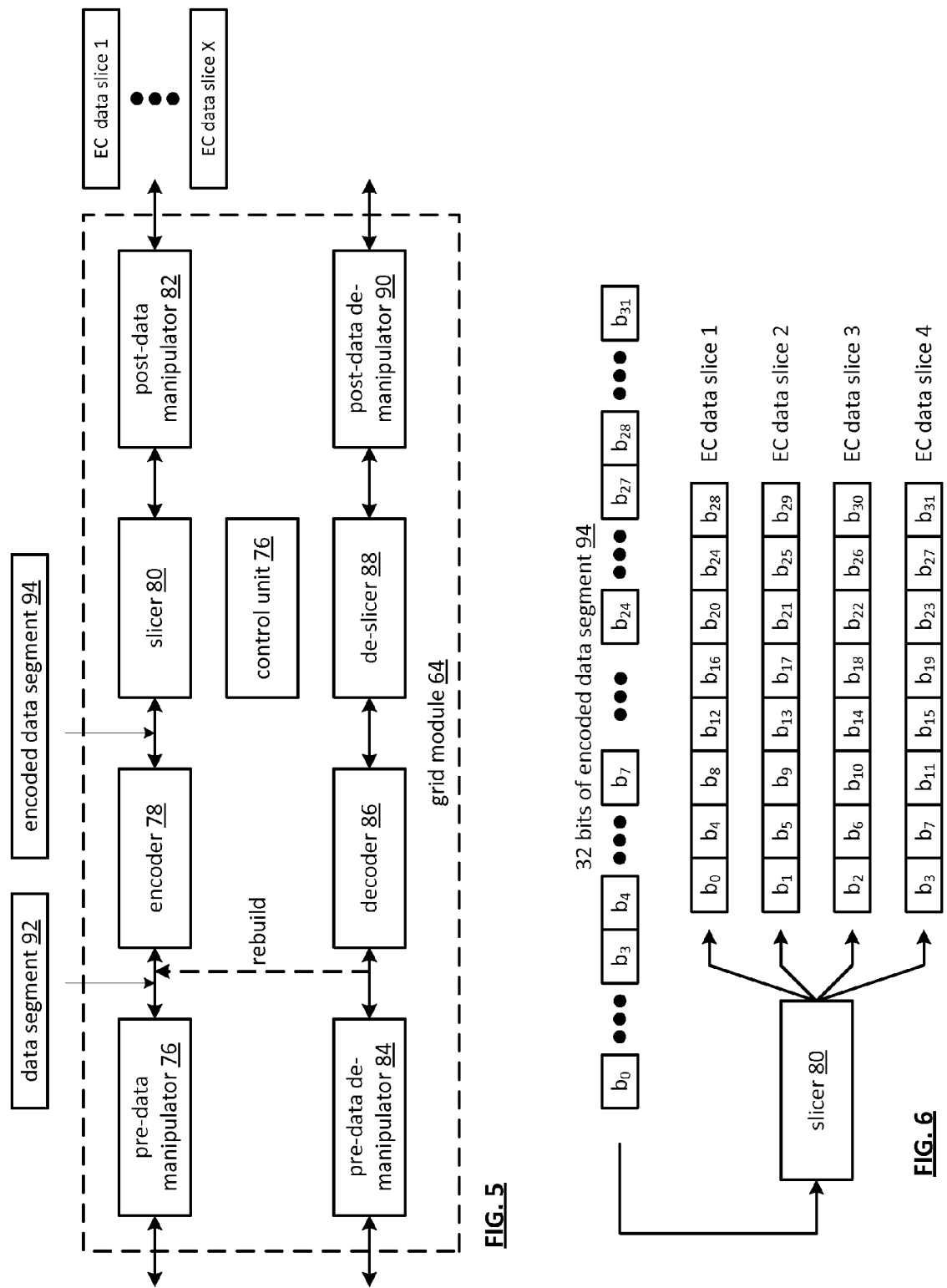

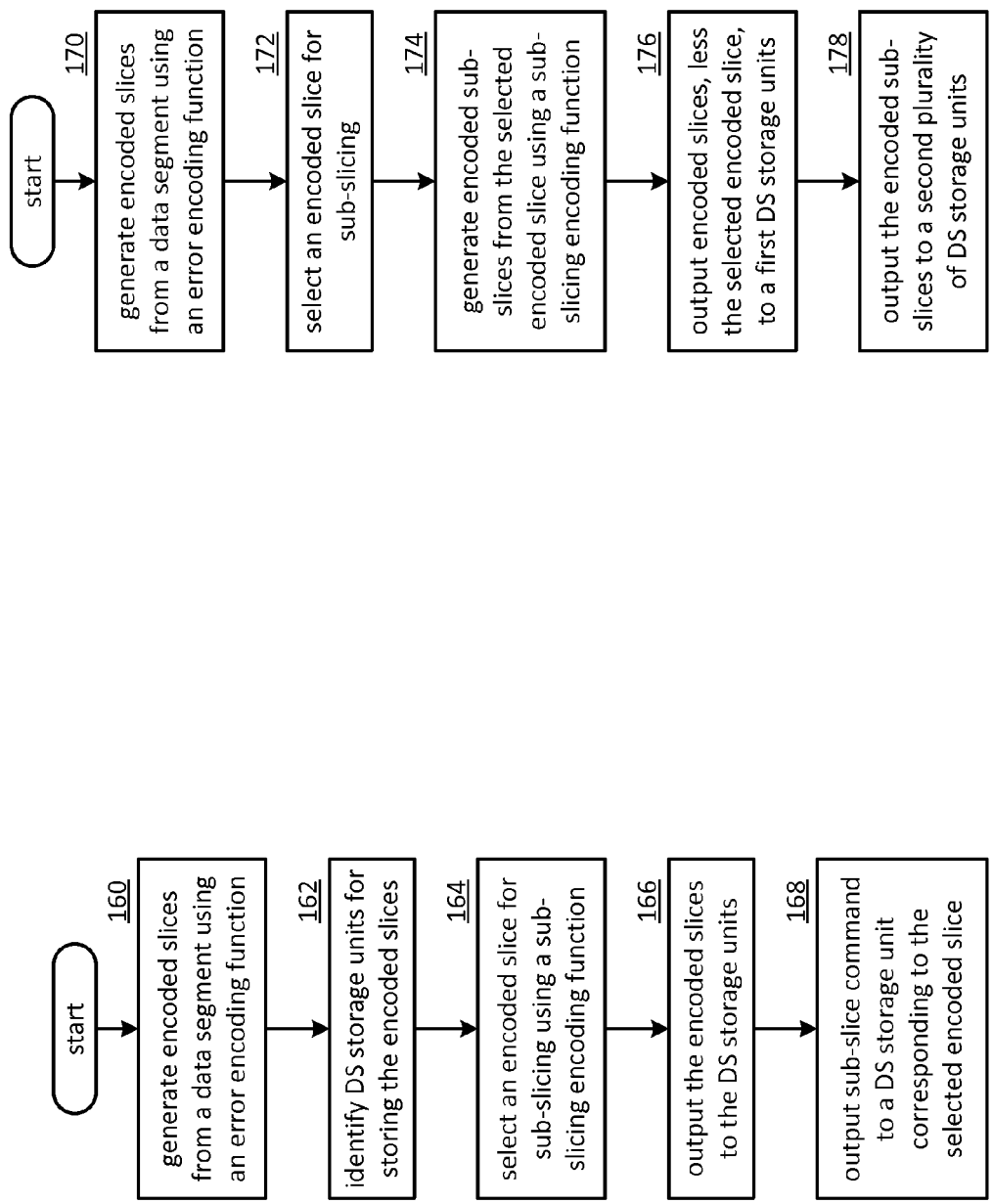

US 9,047,217 B2

NESTED DISTRIBUTED STORAGE UNIT AND APPLICATIONS THEREOF

CROSS-REFERENCE To RELATED APPLICATIONS

This patent application is claiming priority under 35 USC §119 to a provisionally filed patent application entitled DISPERSED STORAGE NETWORK STORAGE SYSTEM, having a provisional filing date of Aug. 27, 2009, and a provisional Ser. No. 61/237,652.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

BACKGROUND OF THE INVENTION

1. Technical Field of the Invention

This invention relates generally to computing systems and more particularly to memory within such computing systems.

2. Description of Related Art

Computing systems are known to communicate, process, and store data. Such computing systems range from wireless smart phones, to an individual computer, to a network of computers, to data centers that support millions of web searches, stock trades, and/or on-line purchases. The data storage part of the computing system typically includes one or more memory devices corresponding to the various operational aspects of the processing and communication functions. For example, read only memory (RAM) memory is typically used for the main memory of the computing system because it can be accessed in any random order with a constant response time. As another example, memory device technologies that require physical movement (e.g., magnetic disks, tapes, RAID (redundant array of inexpensive disks), and/or optical disks) are used for secondary storage of the computing system since they have a variable response time as the physical movement can take longer than the data transfer.

Each memory device used in a computing device operates in accordance with one or more storage standards (e.g., network file system (NFS), flash file system (FFS), disk file system (DFS), small computer system interface (SCSI), internet small computer system interface (iSCSI), file transfer protocol (FTP), and web-based distributed authoring and versioning (WebDAV)). Despite standardized operations, memory devices fail; especially disk drives that are used in a stand-alone mode. For example, it is common for a commercial grade disk drive to suffer from bit level corruption during its life, which, on average, is about three years. One obvious solution for reducing disk drive failures is to use higher quality disk drives, which have a longer life, but are significantly more expensive.

Another solution for reducing the risk for losing data due a disk drive failure is to use redundant disk drives (e.g., RAID), which replicates the data into two or more copies. RAID includes an array of disk drives that store parity data and the original data. The parity data is calculated such that the failure of one or more disks will not result in the loss of the original data. For example, RAID 5 uses three or more disks to protect data from the failure of any one disc. In RAID 5, the parity data adds about 50% overhead to the storage of the original data. As another example, RAID 6 can recover from a loss of two disks and requires a minimum of four disks with an efficiency of n−2.

While RAID offers many advantages over stand-alone disk drivers, disk drives within RAID fail and data can be lost. For instance, as more disks are added, the probability of one or more disks failing rises, especially if lower quality disks are used. When one disk fails, if it not replaced before another disk fails, then data is lost. To reduce the risk of losing data, mirroring of RAID arrays at different physical locations is used. While this reduces the risk of losing data, it increases the vulnerability of the data to unauthorized access.

Therefore, a need exists for a data storage solution that provides effective timeless continuity of data, minimizes adverse affects of multiple memory elements failures, provides data security, is adapted to a wide variety of storage system standards, and/or is compatible with computing and communications systems.

BRIEF DESCRIPTION OF THE SEVERAL VIEWS OF THE DRAWING(S)

FIG. 4 is a schematic block diagram of an embodiment of a dispersed storage (DS) processing module in accordance with the invention;

FIG. 5 is a schematic block diagram of an embodiment of a grid module in accordance with the invention;

FIG. 6 is a diagram of an example embodiment of error coded data slice creation in accordance with the invention;

FIG. 17 is a logic diagram of another embodiment of a method for storage dispersion in accordance with the present invention;

FIG. 18 is a logic diagram of another embodiment of a method for storage dispersion in accordance with the present invention.

DETAILED DESCRIPTION OF THE INVENTION

Figure 1:
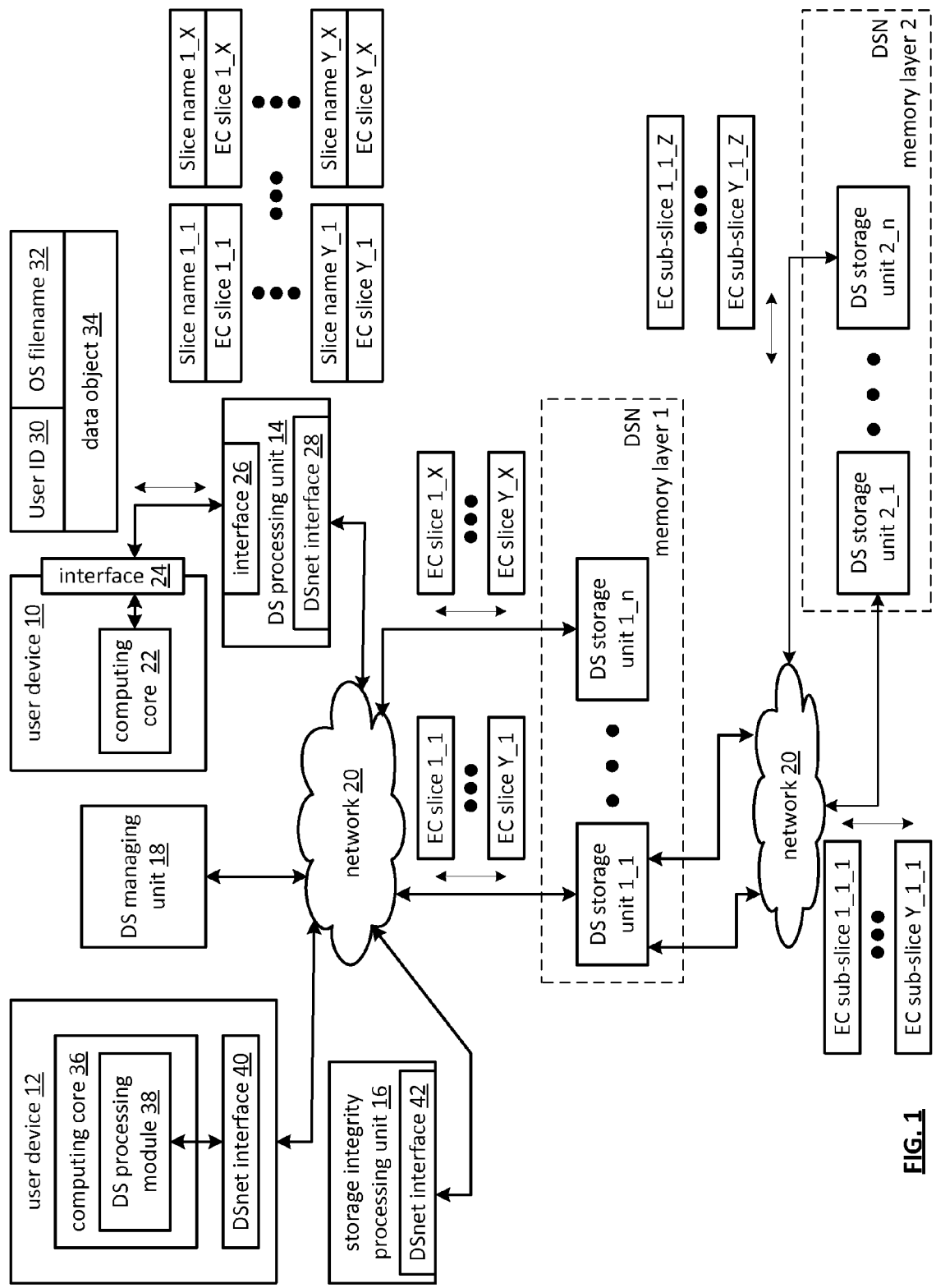
FIG. 1 is a schematic block diagram of an embodiment of a computing system in accordance with the invention.

FIG. 1 is a schematic block diagram of an embodiment of a computing system that includes a first user device 10, a dispersed storage (DS) processing unit 14, a plurality of dispersed storage network (DSN) memory layers 1 & 2 (but could include more than two), a storage integrity processing unit 16, a second user device 12, a DS managing unit 18, and a network 20. Each of the DSN memory layers include a plurality of dispersed storage (DS) storage units 1-$n$, where n is equal to or greater than 3 and may vary from layer to layer. Note that a DS storage unit may be in one or more DSN memory layers. The DSN memory layers may be a subset of the total set of DS storage units.

Each of the user devices 10 and 12 (note that the system may include more than 2 user devices) may be a portable device and/or a fixed device. For example, a portable device may be a cell phone, a smart phone, a personal digital assistant, a digital music player, a digital video player, a laptop computer, a handheld computer, a video game controller, and/or any other portable computing equipment. A fixed device may be a personal computer, a computer server, a cable set-top box, a satellite receiver, a television set, a printer, a fax machine, home entertainment equipment, a video game console, and/or any type of home or office computing equipment.

The user device 10 includes a computing core 22 (which will be described in greater detail with reference to FIG. 3) and an interface 24. The interface 24, which includes hardware and/or firmware, communicates with the DS processing unit 14 using one or more storage system standards such that the user device 10 utilizes a storage standard native to its operating system. The user device 12 includes a computer core 36 (which may be of the same construct as the computing core 22 of user device 10) and a DS network interface 40. The computing core 36 includes a DS processing module 38.

Each of the DS processing unit 14, the DS storage units, the storage integrity processing unit 16, and/or the DS managing unit 18 may be a portable device, may be a fixed device, and/or may be a functional module within another unit and/or device. For example, the DS managing unit 18 may be a computer server and the storage integrity processing unit 16 may be a functional module operating on the computer server. In another example, the DS processing unit 14 may be a DS processing module operating on the same computing device as one of the DS storage units. Further, each of the DS processing unit 14, the DS storage units, the storage integrity processing unit 16, the DS managing unit 18 includes a DS network interface 28, 40, 42 (whether shown or not). The DS network interface provides connectivity to the network 20 and includes the hardware and/or firmware to support the protocol of the network (e.g., LAN, WLAN, WAN, public switching network, the internet, etc.).

The network 20 may be a wire lined and/or wireless communication system or a system of systems that provide communications capability between the devices and units. The system of systems may be a combination of private intranets and the public internet. For example, the DS processing unit 14 has access to the network 20 by way of an optical sub-network and the second user device 12 has access to the network 20 by way of a 4G Long Term Evolution (LTE) wireless network. As another example, the DS storage units may communicate with each other via the network 20 and/or via direct connections therebetween, whether they are in the same DSN memory layers or a different DSN memory layer.

In an example of operation of the computing system, the computing core 22 of the user device 10 initiates the sequence to store data by transmitting a data object 34 to the DS processing unit 14 via the interfaces 24 and 26. The data object 34 may include a data file, data blocks, a real time data stream and/or any other format of digital information. The data object may further include a user identification code (ID) 30 and an operating system (OS) filename 32 to mimic a conventional file system interface and/or block system interface (e.g., network file system (NFS), flash file system (FFS), disk file system (DFS), small computer system interface (SCSI), internet small computer system interface (iSCSI), file transfer protocol (FTP), and web-based distributed authoring and versioning (WebDAV)).

The DS processing unit 14 receives the data, or data object 34, and breaks it down into Y data segments. For example, if the data object is 1 Giga-Byte (GB), the DS processing unit 14 may segment the data object into 1000 1 Mega-Byte (MB) data segments. The DS processing unit 14 then error encodes (e.g., using an error encoding function such as a forward error correction function, an information dispersal algorithm, etc.) each data segment to produce X error coded (EC) slices per data segment. The value X represents the width of the error encoding function. For example, X may range from 4 to 256 or more. The number of slices X per segment may also be referred to pillars.

The DS processing unit 14 creates a unique slice name (e.g., 1_1; 1_X; Y_1; Y_X) for each error coded (EC) data slice and attaches the slice name to each EC data slice (e.g., 1_1; 1_X; $Y_{13}$ 1; Y_X). The slice name includes universal DSN memory layer addressing routing information and user-specific information based on the OS filename 32 to tie the two together. The creation and utilization of the slice name will be described in greater detail with reference to one or more of FIGS. 2-18.

The DS processing unit 14 may also determine to further error encode one or more of the slices of a segment (i.e., sub-slicing). Such a determination may be based on a number of factors. For example, the DS processing unit 14 may determine that further security may be obtained by sub-slicing a select number (e.g., a security threshold) of the slices per segment, which may be from the same pillars for each segment or from different pillars from segment to segment. As a specific example, if the width (i.e., X) is 16 and the read threshold (e.g., minimum number of slices required to reconstruct the data segment) is 10, then 7 or more slices per segment may be sub-sliced such that a read threshold cannot be achieved without reconstructing a slice from the sub-slices.

The DS processing unit 14 may also determine to sub-slice at least one slice of a data segment for a number of other reasons. For example, one or more of retrieval latency for each of the DS storage units; priority of the selected encoded slice; a data type of the data segment; availability of each of DS storage units; and/or cost of storing an encoded slice in each of the DS storage units may affect the determination to sub-slice.

The DS processing unit 14 may perform the sub-slicing of one or more slices itself or may instruct one or more of the DS storage units to perform the sub-slicing. When the DS processing unit 14 performs the sub-slicing, it adds memory layer 2 slice names to the sub-slices (e.g., 1_1_1; Y_1_1; 1_1_Z; Y_1_Z), where Z corresponds to the width of the sub-slicing. When the DS processing unit 14 wants a DS storage unit to perform the sub-slicing, it generates a corresponding command. As another example, the DS processing unit 14 does not initiate the sub-slicing; one or more of the DS storage units makes the determination for the slices it is to store.

Having generated the EC slices and rendered a decision regarding sub-slicing (or no decision), the DS processing unit 14 sends the EC slices 1 through X of a data segment to the DS storage units 1_1 through 1_n of the first DSN memory layer. The DS processing unit 14 may also send a command regarding sub-slicing with one or more of the EC slices to the corresponding DS storage unit. For example, if the DS processing unit 14 has determined that the first slice (e.g., 1_1; Y_1) of each segment is to be sub-sliced, it sends the command to DS storage unit 1_1 with at least the first slice (e.g., 1_1). Note that the command may be for an individual data segment, the data object, or a portion thereof.

Upon receiving an EC slice, a DS storage unit determines whether it will sub-slice the EC slice. Such a determination may be based on receiving a command from the DS processing unit 14 or an individual determination based on at least some of the same factors that the DS processing unit 14 may use to render a sub-slicing decision. If the DS storage unit is not to sub-slice the EC slice, it translates the virtual DSN memory layer address of the slice name into a local physical address and stores the EC slice at the physical address.

If a DS storage unit determines that it is to sub-slice an EC slice, it creates EC data sub-slices the EC data slice using a sub-slicing algorithm (e.g., a forward error correction algorithm, an information dispersal algorithm, etc.). In addition, the DS storage unit creates a unique sub-slice name (e.g., 1_1_1; 1_1_Z; Y_1_1; Y_1_Z, where Z corresponds to the width of the sub-slicing algorithm) for each sub-slice and attaches it to the corresponding sub-slice. The sub-slice names may also include universal DSN memory layer addressing routing information and user-specific information to tie the two together.

The DS storage unit may also determine to further sub-slice at least one sub-slice of an EC slice for similar reasons used by the DS processing unit to determine whether to sub-slice an EC slice. The DS storage unit may perform the further sub-slicing of a sub-slice itself or may instruct one or more of the DS storage units of the next memory layer to perform the further sub-slicing. When the DS storage unit performs the further sub-slicing, it adds memory layer 3 further sub-slice names to the sub-slices (e.g., 1_1_1_1; Y_1_1_1; 1_1_1_A; Y_1_1_A), where A corresponds to the width of the further sub-slicing. When the DS storage unit wants a DS storage unit to perform the further sub-slicing, it generates a corresponding command.

Having generated the sub-slices and rendered a decision regarding further sub-slicing, the DS storage unit sends the sub-slices 1_1 through 1_Z of an EC slice to the DS storage units 2_1 through 2_n of the seconds DSN memory layer. The DS storage unit may also send a command regarding further sub-slicing of one or more of the sub-slices to the corresponding DS storage unit.

Storage of data for the user device 12 operates in a similar manner as described above, with the exception that the user 12 includes the DS processing unit functionality within its computer core 36. More specifically, the user device 12 includes a DS processing module 38, which performs similar functions as performed by the DS processing unit 14.

In another example of operation, the DS managing unit 18 functions to receive and aggregate network management alarms, alerts, errors, status information, performance information, and/or messages from the modules and/or units of the computing system. The DS managing unit 18 functions may also include functions to configure the computing system and perform a billing function for the computing system. For example, the DS managing unit 18 may determine the number of DS storage units to configure to meet the operation requirements of a particular user. The configuration may include assignment of DSN memory layer addresses. In another example, the DS managing unit may track the usage of the DSN memory layers by the user to create a summary and/or bill. The DS managing unit 18 may also automatically determine optimization of the configuration of the computing system based in part from determining the correlation of past and present configurations with performance. The DS managing unit 18 may share the correlation and configurations with other computing systems managing a different DSN memory layers to further optimize the computing system.

In another example of operations, the storage integrity processing unit 16 scans the contents of the DSN memory layers to detect undesired conditions including data corruption, missing data, out of date data, and/or offline DS storage units. When the storage integrity processing unit 16 detects an undesired condition, it rebuilds a portion of the data in the DSN memory layers and alerts the DS managing unit 18 when undesired conditions are detected. The storage integrity processing unit 16 rebuilds the data by retrieving available data, processing the available data to produce rebuilt data, and storing the rebuilt data in the DSN memory layers. The process to produce rebuilt data will be described in greater detail with reference to FIGS. 4-6.

Figure 2:
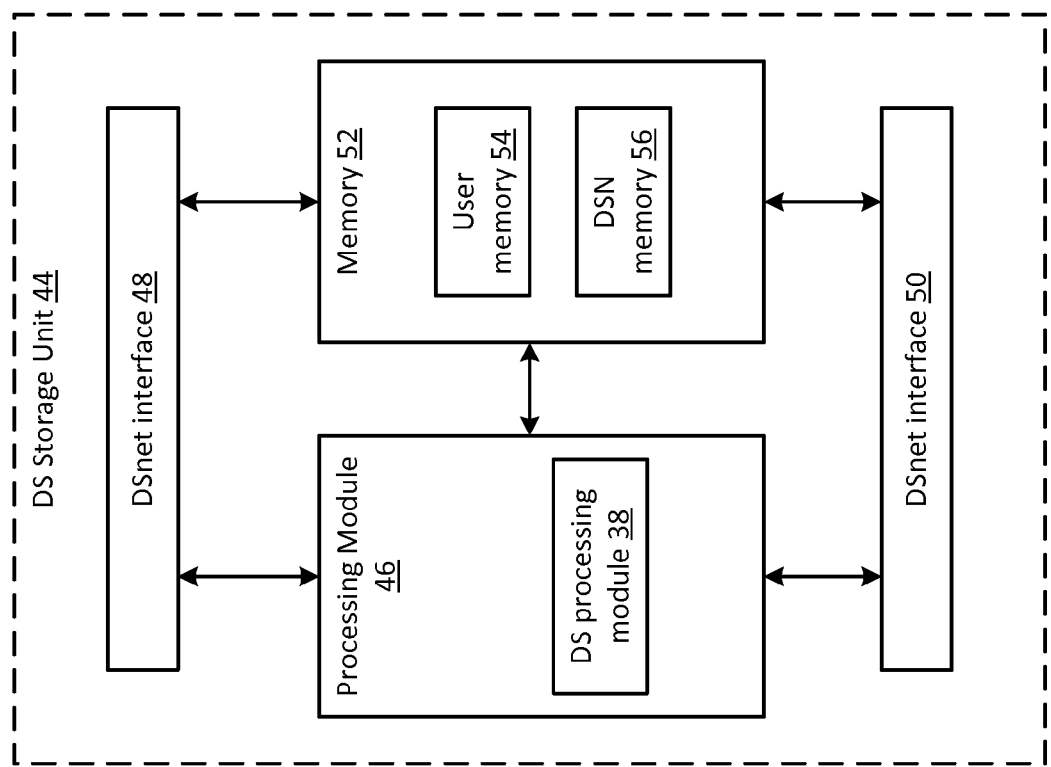
FIG. 2 is a schematic block diagram of an embodiment of a dispersed storage (DS) storage unit in accordance with the invention.

FIG. 2 is a schematic block diagram of an embodiment of a dispersed storage (DS) storage unit 44 (e.g., any of the DS storage units of FIG. 1) that includes a processing module 46, at least one DSnet interface 48-50, and a memory 52. The processing module 46 includes a DS processing module 38 and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-18.

In an example of operation, the processing module 46 receives, via the DSnet interface 48, an EC data slice (or sub-slice) for storage and may further receive a command regarding further sub-slicing of the EC data slice. When the command is received, the processing module 46 interprets it to determine whether the EC slice is to be sub-sliced. Note that the command may include instructions not to sub-slice the EC slice, may include instructions that the EC slice is to be sub-sliced and the sub-slicing function to use, or it may include an instruction to sub-slice leaving the details to the DS storage unit 44.

When a command is received and it includes instructions to sub-slice, the DS processing module 38 performs the sub-slicing as described with reference to FIG. 1 and as will be described with reference to one or more of FIGS. 7-18. When a command is not received, the processing module 46 determines whether to sub-slice the received EC slice (or sub-slice). Such a determination may be made based on demands of user memory 54 and/or of DSN memory 56. For instance, if the DSN memory 56 has limited availability, then sub-slicing and storing the EC slice elsewhere may be preferred. In this instance, the processing module 46 determines how to re-disperse the EC slice (or sub-slice). The determination may be based on guidance from one or more of a user vault (e.g., stored parameters for this user), a command from the DS managing unit or other system element, priority of the EC data slice, type of data in the EC data slice, and/or retrieval speed requirements. The re-dispersion guidance may include the parameters for encoding, slicing and which DS storage units 44 to utilize.

Having rendered a decision on how to sub-slice, the processing module 46 creates EC sub-slices and sends the EC data sub-slices to other DS storage units via the DSnet interface 50. In addition, the processing module 46 updates a virtual DSN address to physical location table with the locations of the EC data sub-slices. The processing module 46 may store the virtual DSN address to physical location table in the user memory 54 and/or may send the table to another DSN element (e.g., a higher memory level DS storage unit, the DS processing unit 14, the DS managing unit 18, the storage integrity processing unit 16, and/or the user device 10 12). The virtual DSN address to physical location table will be discussed in greater detail with reference to FIGS. 8 and 11.

Figure 3:
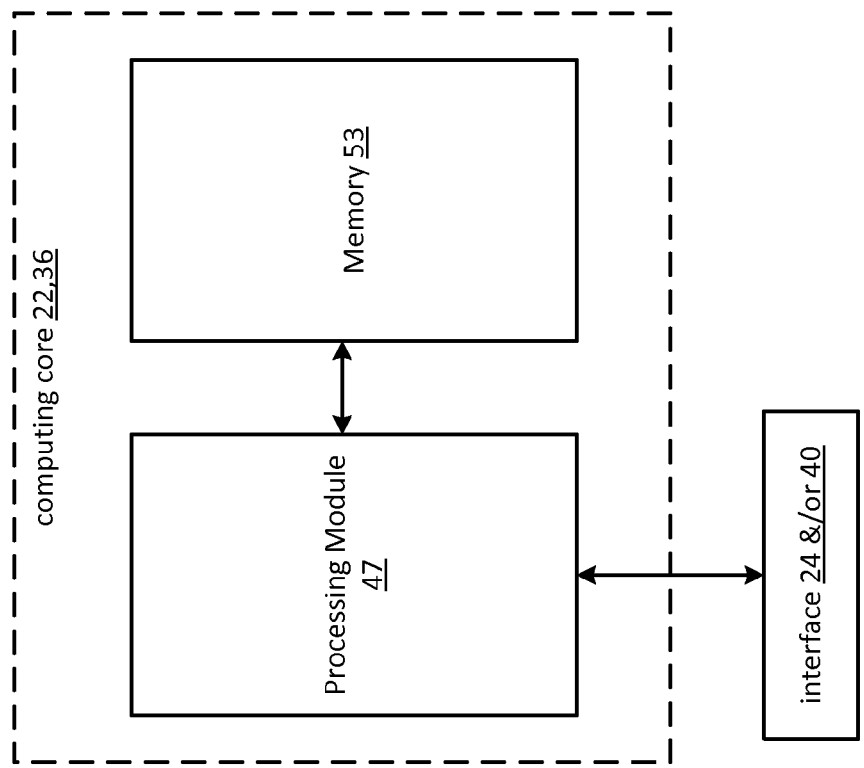
FIG. 3 is a schematic block diagram of an embodiment of a computing core in accordance with the invention.

FIG. 3 is a schematic block diagram of an embodiment of a computing core 22 and/or 36 that includes a processing module 47 and memory 53. The computing core 22 and/or 36 may be of a conventional central processing unit architecture and/or a proprietary architecture. In such a computing core 22 and/or 36, the memory 53 includes cache (levels 1 and/or 2), main memory (e.g., RAM), secondary memory (e.g., internal hard drive, solid-state memory, etc.), and/or backup memory (external hard drive, magnetic tape, etc.). The processing module 47 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-18.

FIG. 4 is a schematic block diagram of an embodiment of a dispersed storage (DS) processing module 38 of user device 12 and/or of the DS processing unit 14. The DS processing module 38 includes a gateway module 60, an access module 62, a grid module 64, a storage module 66, and a bypass/feedback path. The DS processing module 38 may also include an interface 70 (e.g., interface 28) and the DSnet interface 68 or the interfaces 68 and/or 70 may be part of user 12 or of the DS processing unit 14.

In an example of storing data, the gateway module 60 of the DS processing module 38 receives an incoming data object (e.g., a data file, a data block, an EC data slice, etc.), authenticates the user associated with the data object, obtains user information of the authenticated user, and assigns a source name to the data object in accordance with the user information. To authenticate the user, the gateway module 60 verifies the user ID 30 with the managing unit 18 and/or another authenticating unit. If the user ID is verified, the gateway module 60 retrieves the user information from the managing unit 18, the user device, and/or the other authenticating unit based on the user ID.

The user information includes a vault identifier, operational parameters, and user attributes (e.g., user data, billing information, etc.). A vault identifier identifies a vault, which is a virtual memory space that maps to a set of DS storage units 44. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, an encryption algorithm, a slicing parameter, a compression algorithm, an integrity check method, caching settings, parallelism settings, and/or other parameters that may be used to access the DSN memory layer.

The gateway module 60 determines the source name to associate with the data object based on the vault identifier and the data object. For example, the source name may contain a data name (block number or a file number), the vault generation number, the reserved field, and the vault identifier. The data name may be randomly assigned but is associated with the user data object.

The gateway module 60 may utilize the bypass/feedback path to transfer an incoming EC data slice to another DS storage unit 44 when the DS processing module 38 determines that the EC data should be transferred. The determination process will be described in greater detail with reference to one or more of FIGS. 5-18. Alternatively, or in addition to, the gateway module 60 may use the bypass/feedback path to feedback an EC slice for sub-slicing.

The access module 62 receives the data object and creates a series of data segments 1 through Y therefrom. The number of segments Y may be chosen or random based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the source name.

The grid module 64 may pre-manipulate (e.g., compression, encryption, cyclic redundancy check (CRC), etc.) the data segment before creating X error coded data slices for each data segment. The grid module 64 creates XY error coded data slices for the Y data segments of the data object. The grid module 64 adds forward error correction bits to the data segment bits in accordance with an error coding algorithm (e.g., Reed-Solomon, Convolution encoding, Trellis encoding, etc.) to produce an encoded data segment. The grid module 64 determines the slice name and attaches the unique slice name to each EC data slice.

The number of pillars, or slices X per data segment (e.g., X=16) is chosen as a function of the error coding objectives. The DS processing module 38 may utilize different error coding parameters for EC data slices and EC data sub-slices based on guidance from one or more of a user vault (e.g., stored parameters for this user), a command from the DS managing unit or other system element, priority of the EC data slice, type of data in the EC data slice, and/or retrieval speed requirements. A read threshold T (e.g., T=10) of the error coding algorithm is the minimum number of error-free error coded data slices required to be able to reconstruct a data segment. The DS processing unit can compensate for X-T (e.g., 16-10=6) missing error coded data slices per data segment.

The grid module 64, which will be described in greater detail with reference to FIGS. 5 and 6, receives each data segment 1-Y and, for each data segment generates X number of error coded (EC) slices using an error coding function. The grid module 64 also determines the DS storage units 44 for storing the EC data slices based on a dispersed storage memory mapping associated with the user's vault and/or DS storage unit 44 attributes, which include availability, self-selection, performance history, link speed, link latency, ownership, available DSN memory, domain, cost, a prioritization scheme, a centralized selection message from another source, a lookup table, data ownership, and/or any other factor to optimize the operation of the computing system.

The storage module 66 may perform integrity checks on the EC data slices and then transmit the EC data slices 1 through X of each segment 1 through Y to the DS Storage units. The DS storage units 44 may store the EC data slices and locally keep a table to convert virtual DSN addresses into physical storage addresses. Alternatively, the DS storage units 44 may create EC data sub-slices of an EC data slice and re-disperse the EC data sub-slices to other DS storage units 44. Note that the number of DS storage units 44 is equal to or greater than the number of pillars (slices X per segment) so that no more than one error coded data slice of the same data segment is stored on the same DS storage unit 44. Further note that EC data slices of the same pillar number but of different segments (e.g., EC data slice 1 of data segment 1 and EC data slice 1 of data segment 2) may be stored on the same or different DS storage units 44.

In an example of a read operation, the user device 10 sends a read request to the DS processing unit 14, which authenticates the request. When the request is authentic, the DS processing unit 14 sends a read message to each of the DS storage units 44 storing slices of the data object being read. The slices are received via the DSnet interface 68 and processed by the storage module 66, which performs a parity check and provides the slices to the grid module 64. The grid module 64 de-slices the slices of a data segment to reconstruct the data segment. The access module reconstructs the data object from the data segments and the gateway module formats the data object for transmission to the user device.

FIG. 5 is a schematic block diagram of an embodiment of a grid module 64 that includes a control unit 76, a pre-data manipulator 76, an encoder 78, a slicer 80, a post-data manipulator 82, a pre-data de-manipulator 84, a decoder 86, a de-slicer 88, and/or a post-data de-manipulator 90. Note that the control unit 76 may be partially or completely external to the grid module 64. For example, the control unit 76 may be part of the computing core at a remote location, part of a user device, part of the DS managing unit 18, or distributed amongst one or more DS storage units.

In an example of write operation, the pre-data manipulator 76 receives a data segment 92 and a write instruction from an authorized user device. The pre-data manipulator 76 determines if pre-manipulation of the data segment 92 is required and, if so, what type. The pre-data manipulator 76 may make the determination independently or based on instructions from the control unit 76, where the determination is based a computing system-wide predetermination, a table lookup, vault parameters associated with the user identification, the type of data, security requirements, available DSN memory, performance requirements, and/or other metadata.

Once a positive determination is made, the pre-data manipulator 76 manipulates the data segment 92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to enhance the value of the data segment 92.

The encoder 78 encodes the pre-manipulated data segment 92 using a forward error correction (FEC) encoder to produce an encoded data segment 94. The encoder 78 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 78 may use a different encoding algorithm for each data segment 92, the same encoding algorithm for the data segments 92 of a data object, or a combination thereof.

The resulting encoded data segment 94 is of greater size than the data segment 92 by the overhead rate of the encoding algorithm by a factor of $d*(X/T)$, where d is size of the data segment 92, X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 80 transforms the encoded data segment 94 into EC data slices in accordance with the slicing parameter from the vault for this user and/or data segment 92. For example, if the slicing parameters are X=16, then the slicer slices each encoded data segment 94 into 16 encoded slices.

The post-data manipulator 82 performs, if enabled, post-manipulation on the encoded slices to produce the EC data slices. The post-data manipulator 82 may be enabled if it determines that post-data manipulation is required. If required, the post-data manipulator 82 determines the type of post-manipulation. The determinations may be based on a computing system-wide predetermination, parameters in the vault for this user, a table lookup, the user identification, the type of data, security requirements, available DSN memory, performance requirements, control unit directed, and/or other metadata. Note that the type of post-data manipulation may include slice level compression, signatures, encryption, CRC, addressing, watermarking, tagging, adding metadata, and/or other manipulation to improve the effectiveness of the computing system.

In an example of a read operation, the post-data de-manipulator 90 receives at least a read threshold number of EC data slices and performs the inverse function of the post-data manipulator 82 to produce a plurality of encoded slices. The de-slicer 88 de-slices the encoded slices to produce an encoded data segment 94. The decoder 86 performs the inverse function of the encoder 78 to recapture the data segment 92. The pre-data de-manipulator 84 performs the inverse function of the pre-data manipulator 76 to recapture the data segment.

FIG. 6 is a diagram of an example of slicing an encoded data segment 94 by the slicer 80. In this example, the encoded data segment includes thirty-two bits, but may include more or less bits. The slicer 80 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 7:
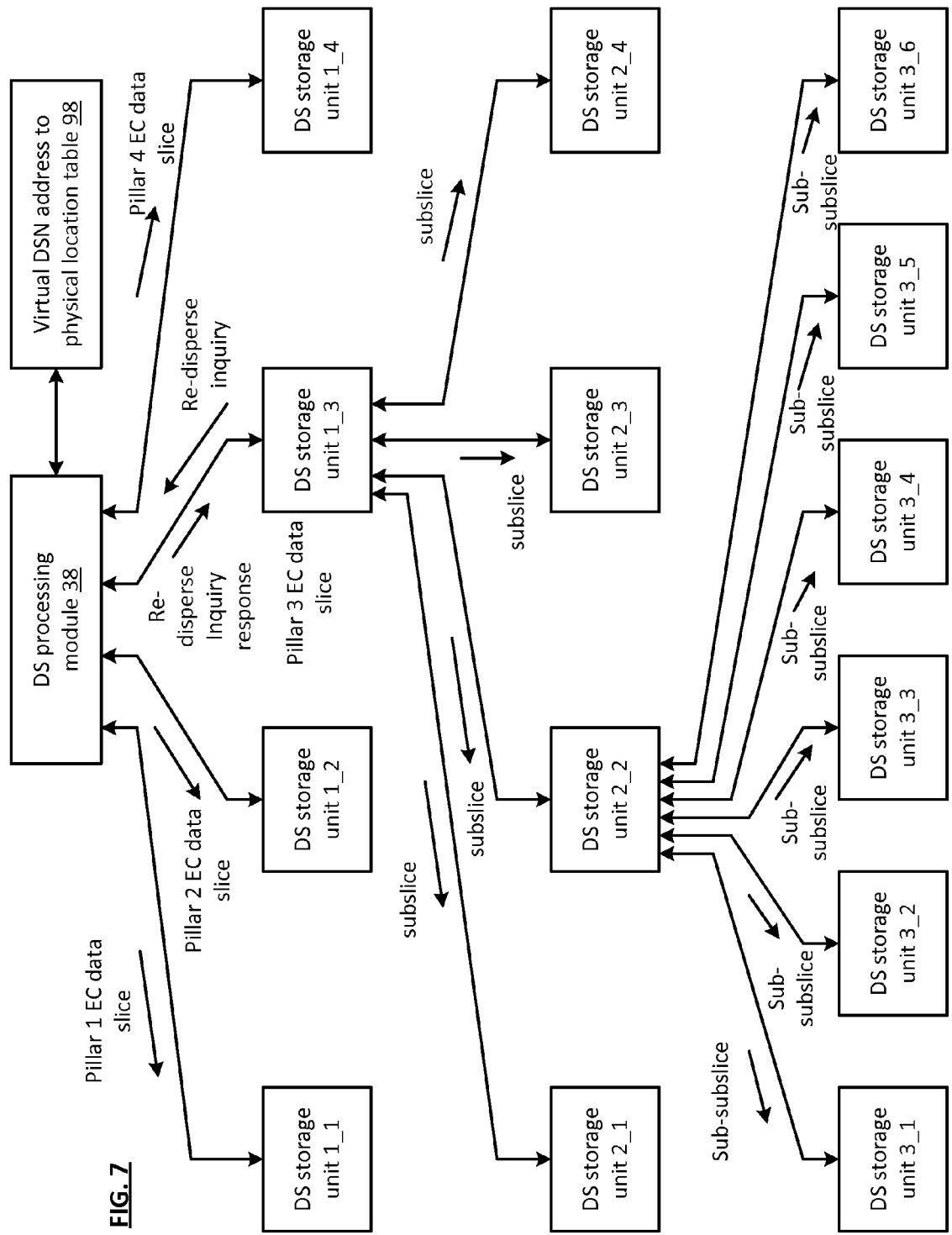
FIG. 7 is a schematic block diagram of an embodiment of a dispersed storage network storage system in accordance with the invention.

FIG. 7 is a schematic block diagram of an embodiment of a dispersed storage network storage system that includes the DS processing module 38, a virtual DSN address to physical location table 98, DSN storage units 1_1 through 1_4 (e.g., DSN memory layer 1), DS storage units 2_1 through 2_4 (e.g., DSN memory layer 2), and DS storage units 3_1 through 3_6 (e.g., DSN memory layer 3). The virtual DSN address to physical location table 98 maintains a list of the physical locations for the EC data slices, for the EC data sub-slices (e.g., first layer), and for the EC data further sub-slices (e.g., second layer). While the DS processing unit maintains the list, DS storage unit 1_3 determines the second layer DS storage units to use for storing the sub-slices and DS storage unit 2_2 determines the third layer DS storage units to use for storing the further sub-slices. The DS storage units (e.g., 1_3, and 2_2) report their selections to the DS processing module 38.

In an example of operation, the DS processing module 38 disperses a data segment as four EC data slices to DS storage units 1_1, 1_2, 1_3, and 1_4 in accordance with the virtual DSN address to physical location table 98. DS storage units 1_1, 1_2, and 1_4 may store the EC data slices locally in DSN memory and may make a corresponding entry in their own local storage location tables. DS storage unit 1_3 may send a re-disperse inquiry message to the DS processing module 38 in response to receiving the EC data slice. The DS processing module 38 may send a re-disperse response message DS storage unit 1_3 to indicate its decision to enable the re-dispersal or to not enable it. The re-disperse response message may also include a list of DS storage units to utilize when re-dispersing and the error encoding function to use. Alternatively, the response message may enable the DS storage unit to make the determination of whether to re-disperse and, if so, how to re-disperse.

In the example, DS storage unit 1_3 prepares four pillars of EC data sub-slices from the pillar 3 EC data slice and sends the sub-slices to DS storage units 2_1, 2_2, 2_3, and 2_4. DS storage unit 1_3 may make an entry in its own local storage location tables where the EC data sub-slices are stored (e.g., DS storage units 2_1 through 2_4) and provides similar information to the DS processing module 38 for inclusion in the table 98. DS storage units 2_1, 2_3, and 2_4 may store the EC data sub-slices locally in DSN memory and may make an entry in their own local storage location tables where the EC data slices are physically stored.

Instead of storing the corresponding sub-slice, DS storage unit 2_2 may send a re-disperse inquiry message to the DS processing module 38 and the above-described process is repeated to enable or not enable DS storage unit 2_2 to further sub-slice. In this example, DS storage unit 2_2 prepares six pillars of EC data sub-slices based on the EC data sub-slice it received from DS storage unit 1_3 and sends them to DS storage units 3_1, 3_2, 3_3, 3_4, 3_5, and 3_6. The DS storage 2_2 provides the identity of the third layer of DS storage units (e.g., units 3_1 through 3_6) to the DS processing unit 38 for inclusion in the table 98. In addition, the DS storage unit 2_2 may locally store the identity of the third layer of DS storage units.

In another example of operation, the DS processing unit 38 receives a data segment retrieval request based on a read file request from a user device. The DS processing module 38 accesses the virtual DSN address to physical location table 98 based on user information of the user device (e.g., vault identifier, user ID, etc.) to determine the DS storage unit locations storing the slices, sub-slices, and sub-sub-slices of the data segment. The DS processing module 38 then sends retrieval commands for the EC data slices to the DSN memory layer 1 DS storage units 1_1, 1_2, 1_3, and 1_4. DS storage unit 1_3 provides retrieval commands to DS storage units 2_1, 2_2, 2_3, and 2_4 and DS storage unit 2_2 provides retrieval commands to DS storage units 3_1, 3_2, 3_3, 3_4, 3_5, and 3_6.

In response to the retrieval request, DS storage 3_1, 3_2, 3_3, 3_4, 3_5, and 3_6 provide their respective sub-sub-slices to the DS storage unit 2_2. DS storage unit 2_2 reconstructs pillar two of the sub-slices from at least a read threshold of the sub-sub-slices and provides it to DS storage unit 1_3. DS storage unit 1_3 reconstructs pillar 3 of the slices from at least a read threshold of the sub-slices it received from DS storage units 2-1 through 2_4. The DS processing module 38 reconstructs the data segment based on at least a read threshold of the EC data slices received from DS storage units 1_1, 1_2, 1_3, and 1_4.

Figure 8:
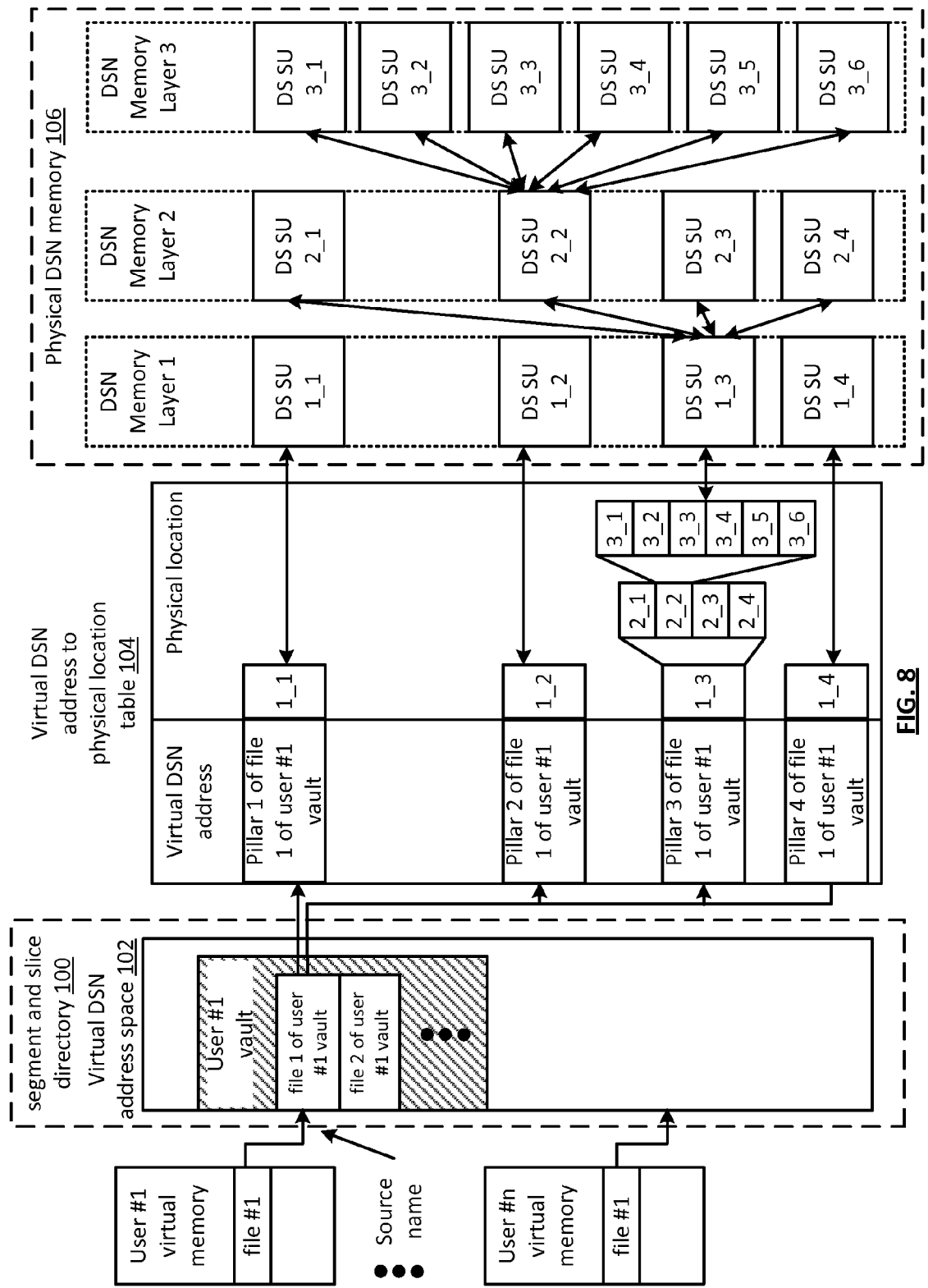
FIG. 8 is a schematic block diagram of an embodiment of a file system hierarchy in accordance with the invention.

FIG. 8 is a schematic block diagram of an embodiment of a file system hierarchy including a plurality of user virtual memories (e.g., user 1-user n), a segment and slice directory 100, the virtual dispersed storage network (DSN) address to physical location table 104, and a physical dispersed storage network (DSN) memory 106. The file system hierarchy may be utilized to translate the user virtual memory address system to the physical DSN memory 106 location by translating the user virtual memory address into a virtual dispersed storage network (DSN) address space 102 and then to the physical DSN memory 106. The segment and slice directory 100 includes the virtual DSN address space 102 and the physical DSN memory 106 includes a plurality of DS storage units that may be organized in one or more DSN memory layers.

As an example, one of the user virtual memories may use a native OS file system to access the segment and slice directory 100 based on source name information that is included in a DSN memory access request (e.g., read, write, delete, list, etc.). A source name vault identifier and a file/block name indexes the segment and slice directory 100 to determine the virtual DSN address space 102. A unique virtual vault is associated with each user and may contain user attributes (e.g., user identification, billing data, etc.), operational parameters, and a list of the DS storage units that will be utilized to support the user.

The total virtual DSN address space 102 may be defined by a forty-eight byte identifier, thus creating $256^{48}$ possible slice names to accommodate addressing EC data slices of segments of data objects (e.g., data file, blocks, streams) of the user vaults. The slice name is a virtual DSN address and remains the same even as different DS storage units are added or deleted from the physical DSN memory 106.

A user has a range of virtual DSN address assigned to their vault. In one embodiment, the virtual DSN addresses typically do not change over the operational lifespan of the system for that particular user. In another embodiment, the virtual DSN address space 102 is dynamically altered from time to time to provide potential benefits including improved security, expansion, retraction, and/or enhanced capability. A virtual DSN address space 102 security algorithm may alter the virtual DSN address space 102 according to one or more of commands (e.g., from the DS managing unit), a scheduled alteration, a detected security breach, and/or any other trigger. Note that the virtual DSN address may be encrypted to enhance security of the system.

The index into the virtual DSN address space 102 by vault and file name creates the slice names (i.e., virtual DSN addresses) to use as an index into the virtual DSN address to physical location table 104. The virtual DSN address to physical location table 104 is sorted by vaults and pillars so that the subsequent addresses are organized by pillar of the file segments that have EC data slices with the same slice identifier and hence are typically stored at the same DS storage unit. The output of the access to the virtual DSN address to physical location table 104 stores the DS storage unit identifiers.

The physical locations may include linking DSN memory layer 1 DS storage units to DSN memory layer 2 DS storage units, to DSN memory layer 3 DS storage units and so forth. For example, DS storage unit 1_3 is linked to DS storage units 2_1, 2_2, 2_3, and 2_4 and DS storage unit 2_2 is linked to DS storage units 3_1, 3_2, 3_3, 3_4, 3_5, and 3_6, which is maintained in the table 104.

Figure 9:
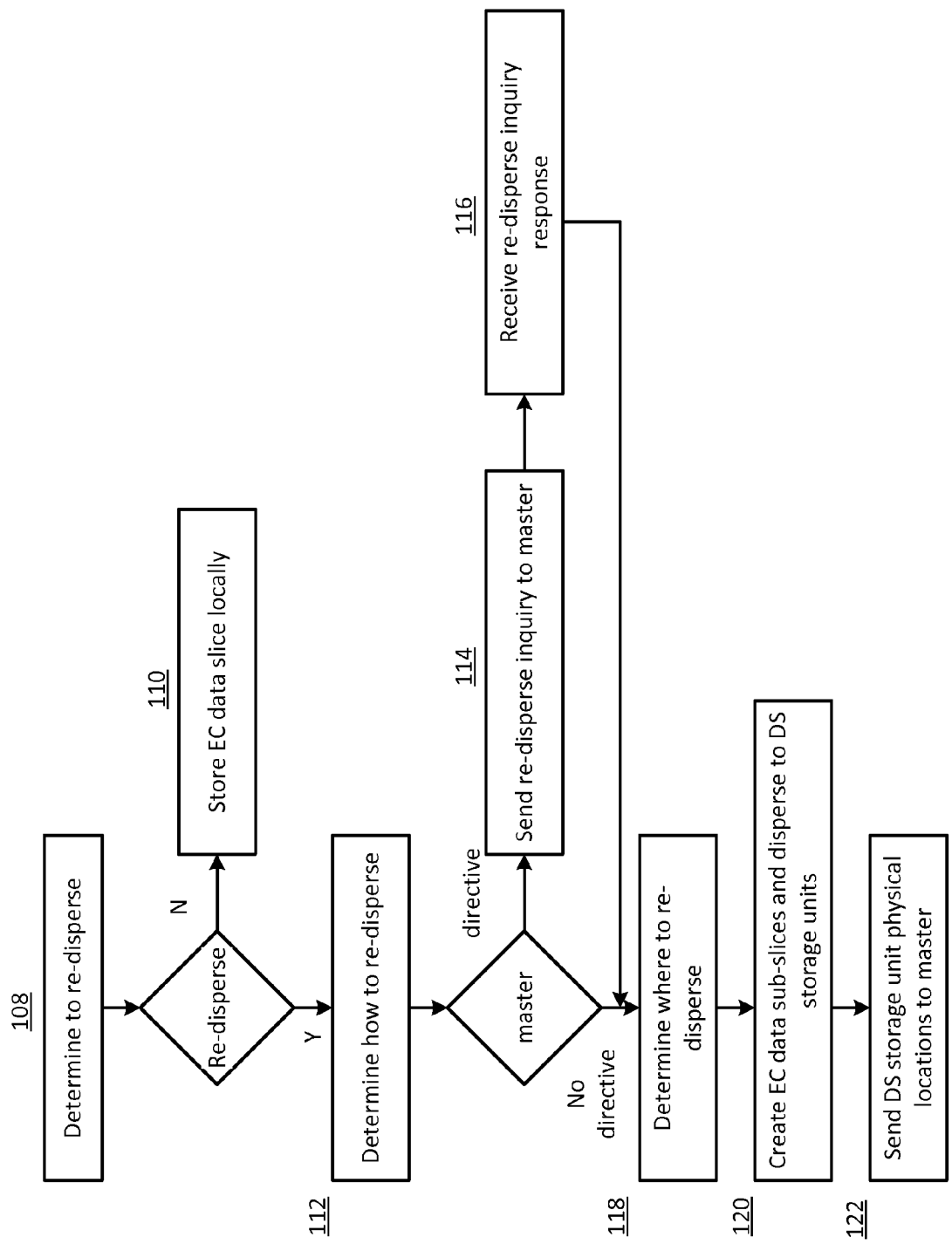
FIG. 9 is a logic diagram of an embodiment of a method for storage dispersion in accordance with the present invention.

FIG. 9 is a logic diagram of an embodiment of a method for storage dispersion that may be executed by a DS storage unit. The method begins at step 108 where the DS storage unit receives an error coded (EC) slice (or sub-slice) and determines whether to re-disperse (e.g., sub-slice) the EC data slice (or sub-slice). The determination may be based on one or more of DSN memory is not available (e.g., the DS Processing module has partitioned less DSN memory, or DSN memory is nearly full), the user ID, the vault ID, a priority level of the EC data slice, the type of data in the EC data slice, a command from a parent level DSN memory level, a command from the DS processing module, and/or any other variable to improve memory performance.

When the EC data slice (or sub-slice) is not to be sub-sliced, the method continues to step 110 where the DS storage unit stores the EC data slice (or sub-slice) locally and updates its local storage location table. If, however, the EC data slice (or sub-slice, etc.) is to be sub-sliced, the method continues at step 112 where the DS storage unit determines the sub-slicing encoding function (e.g., how to re-disperse). Such a determination may be based on instructions included with the EC data slice, the user ID, the vault ID, a priority level of the EC data slice, the type of data in the EC data slice, a command from a parent level DSN memory level, a command for the DS processing module, and/or any other variable to improve memory performance.

The method branches based on whether the DS storage unit seeks help in determining how to re-disperse (e.g., sub-slice). If help is sought, the method continues at step 114 where the DS storage unit sends a re-disperse inquiry to a master DS processing module 38 (e.g., the DS processing unit that started the initial dispersion). The method continues at step 116 where the DS storage unit receives a re-disperse response that indicates re-dispersion guidance (e.g., which DS storage units to store the sub-slices, what error coding and/or IDA to use to create the sub-slices, etc.).

If the DS processing module does not respond because help was not sought or it failed to respond, the method continues at step 118 where the DS storage unit determines the re-dispersion parameters. The method continues at step 120 where the DS storage creates EC data sub-slices. The method continues at step 122 where the DS storage unit sends (i.e., outputs) the EC data sub-slices to the identified DS storage units.

Figure 10:
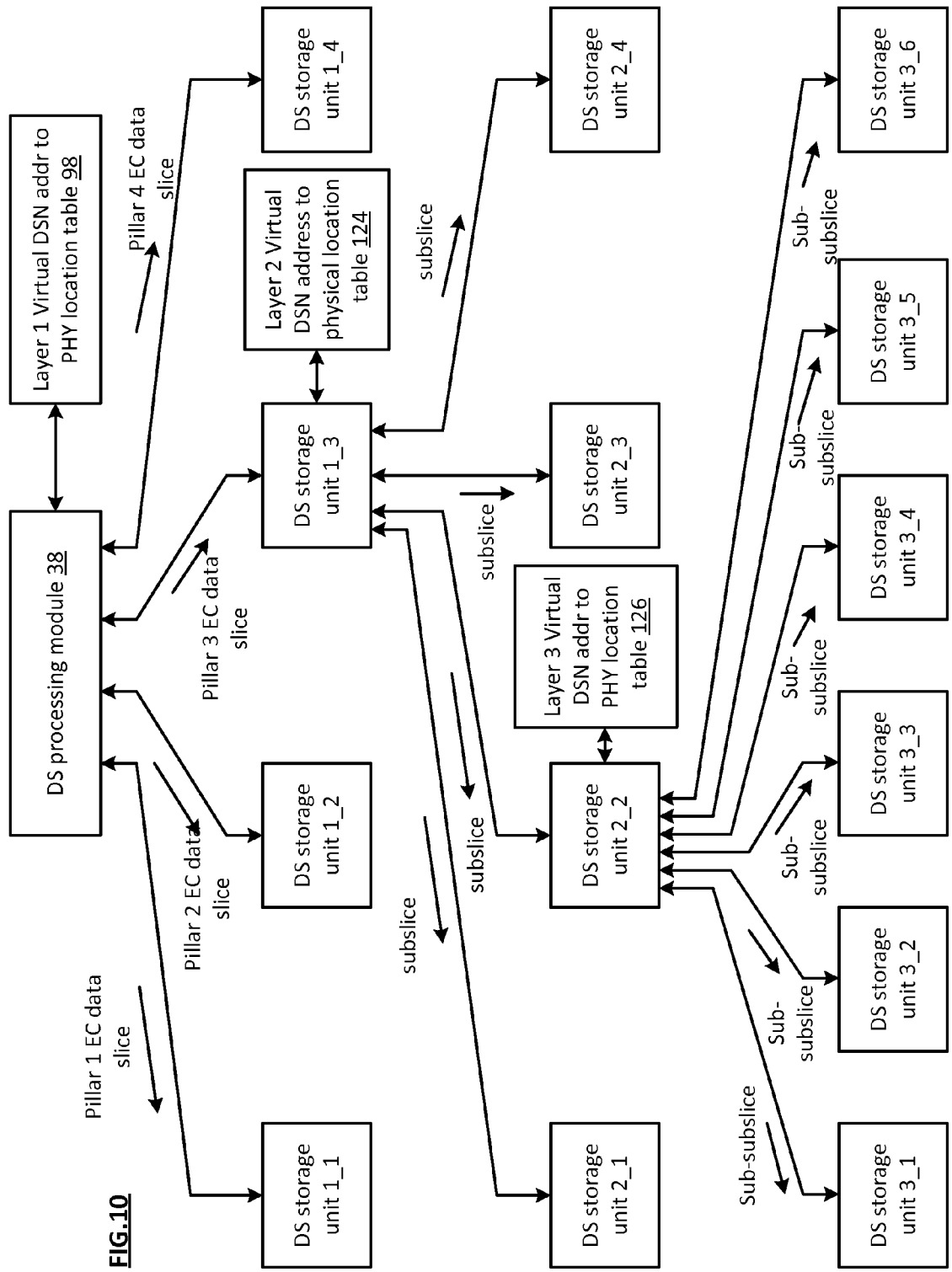
FIG. 10 is a schematic block diagram of another embodiment of a dispersed storage network storage system in accordance with the invention.

FIG. 10 is a schematic block diagram of another embodiment of a dispersed storage network storage system similar to that of FIG. 8. In this embodiment, however, the DS processing module 38 stores a layer 1 virtual DSN address to physical location table 98, which, in this example, identifies DSN storage units 1_1 through 1_4 (DSN memory layer 1). Thus, from the DS processing module's perspective, it creates slices that are stored in the identified DS storage units and does not whether the identified DS storage units stores the slice or has sub-sliced the slice.

In this example, DS storage unit 1_3 is sub-slicing the pillar 3 EC data slice it receives from the DS processing module 38. The information regarding the sub-slicing (e.g., the algorithm used, the identity of the DS storage units storing the sub-slices, etc.) is stored in the Layer 2 virtual DSN address to physical location table 124. As shown, DS storage units 2_1 through 2_4 are storing the sub-slices of pillar 3 EC data slice. Similar to the DS processing unit, the DS storage unit 1_3 does not whether the identified DS storage units are storing their respective sub-slices or have further sub-sliced the sub-slices.

In this example, DS storage unit 2_2 is sub-slicing the pillar 2 sub-slice it receives from the DS storage unit 1_3. The information regarding the sub-sub-slicing (e.g., the algorithm used, the identity of the DS storage units storing the sub-slices, etc.) is stored in the Layer 3 virtual DSN address to physical location table 126. As shown, DS storage units 3_1 through 3_6 are storing the sub-slices of pillar 2 sub-slice.

Figure 11:
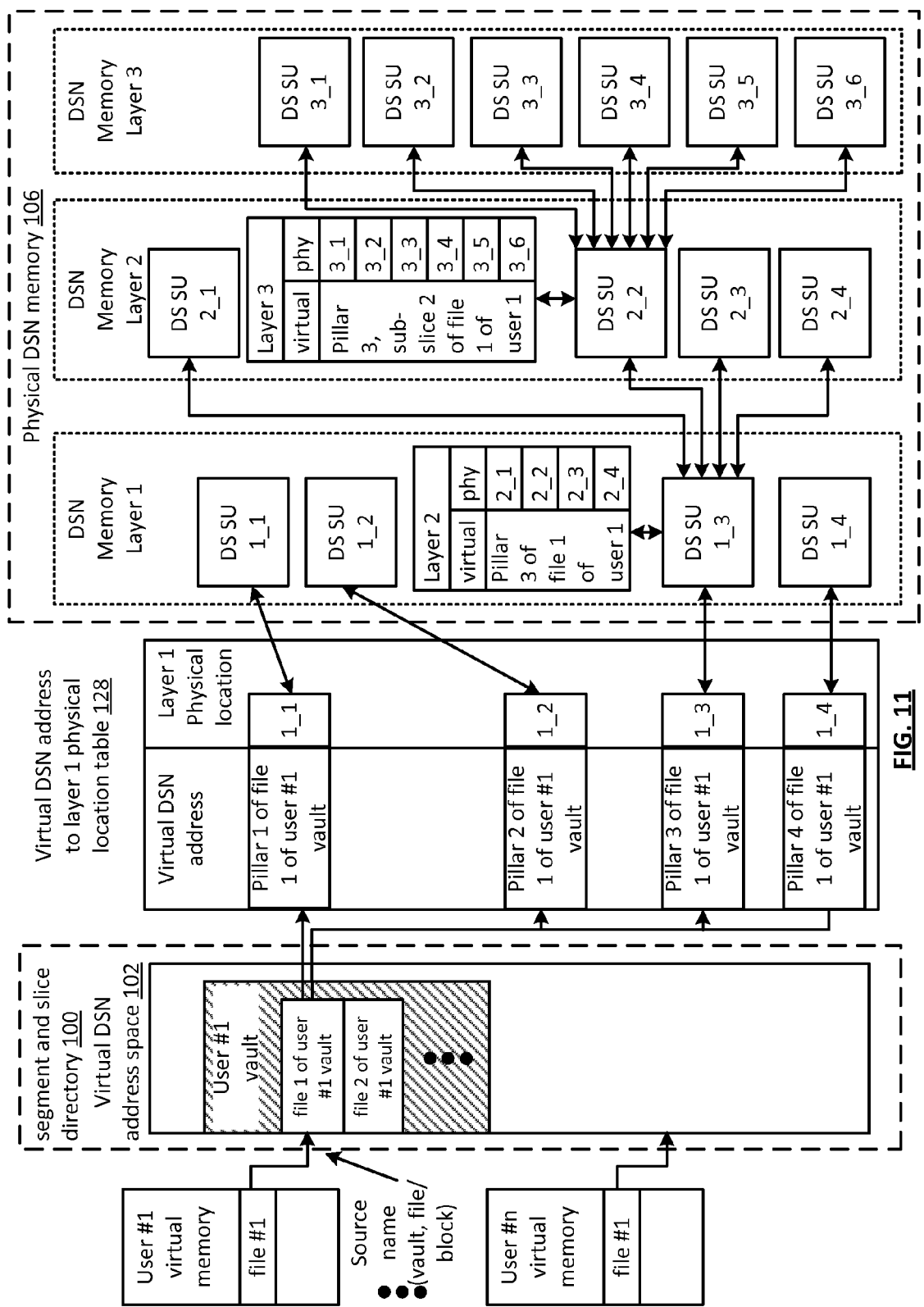
FIG. 11 is a schematic block diagram of another embodiment of a file system hierarchy in accordance with the invention.

FIG. 11 is a schematic block diagram of another embodiment of a file system hierarchy that is similar to FIG. 9, with the exception of where the virtual DSN address to physical location tables are located. In FIG. 9, the DS processing module maintains the table. In this Figure, the DS processing module 38 maintains only the layer 1 virtual DSN address to physical location table 128. As shown, the table 128 includes a column for the virtual DSN address that corresponds to a pillar (e.g., 1-4) and a column for the physical layer location (e.g., the identity of a DS storage unit 1_1 through 1_4).

The table corresponding to the sub-slicing performed by the DS storage unit 1_3 is maintained in the storage unit. Similarly, the sub-sub-slicing performed by DS storage unit 2_2 is maintained in the storage unit.

Figure 12:
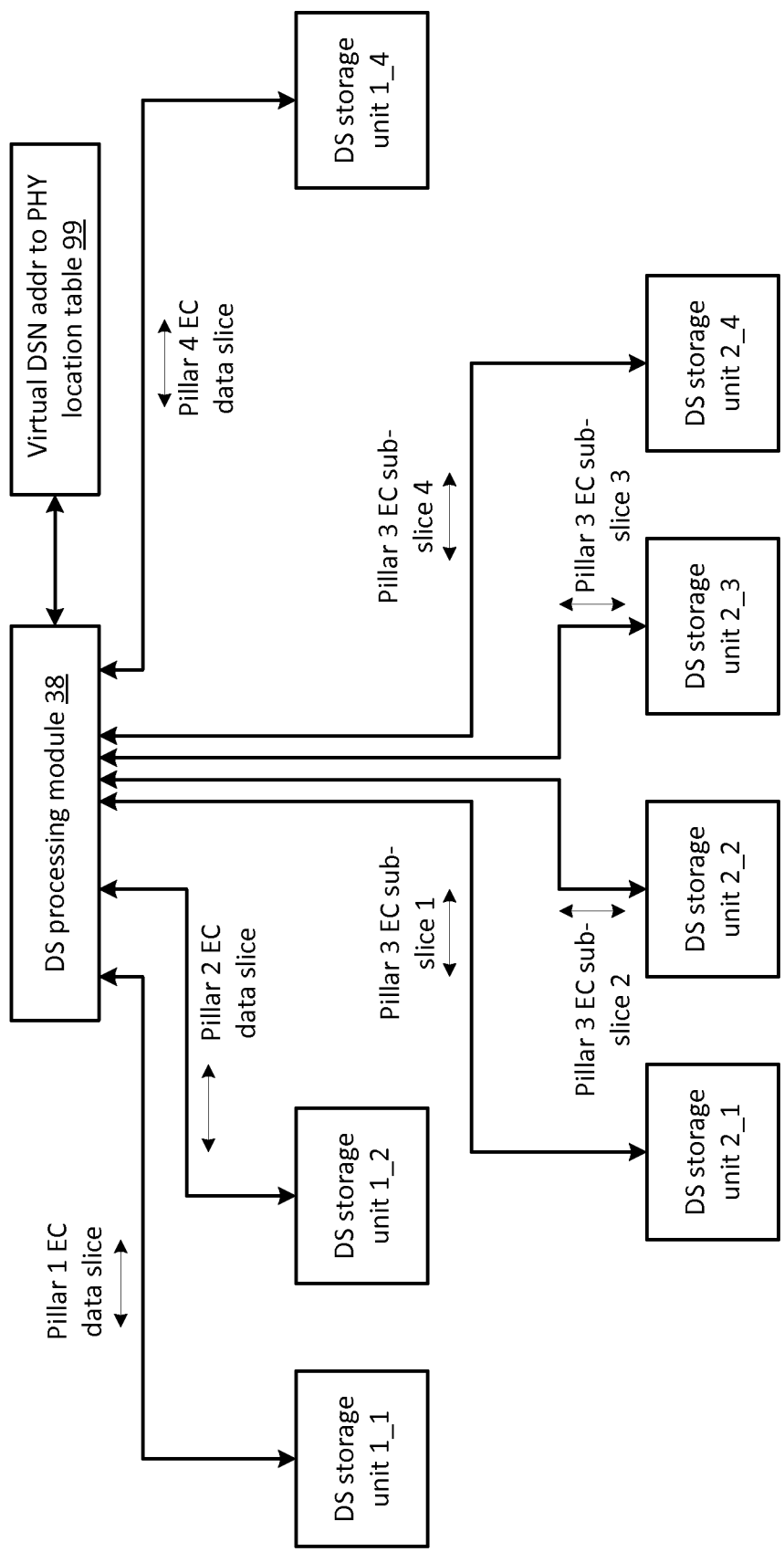
FIG. 12 is a schematic block diagram of another embodiment of a dispersed storage network storage system in accordance with the invention.

FIG. 12 is a schematic block diagram of another embodiment of a dispersed storage network storage system that includes the DS processing module 38, a virtual DSN address to physical location table 99, and a plurality of DS storage units 1_1 through 1_4, and 2_1 through 2_4. In this example, the DS processing module 38 generates a plurality of EC data slices for a data segment as previously discussed. The DS processing module 38 outputs pillar 1, 2, and 4 EC data slices to DS storage units 1_1, 1_2, and 1_4, respectively. The DS processing module 38, however, does not output pillar 3 EC data slice. Instead, it feeds it back for sub-slicing to produce pillar 3 EC sub-slices 1-4, which are sent to DS storage units 2_1 through 2_2. The mapping of the slices and sub-slices to the DS storage units is maintained in the table 99.

Figure 13:
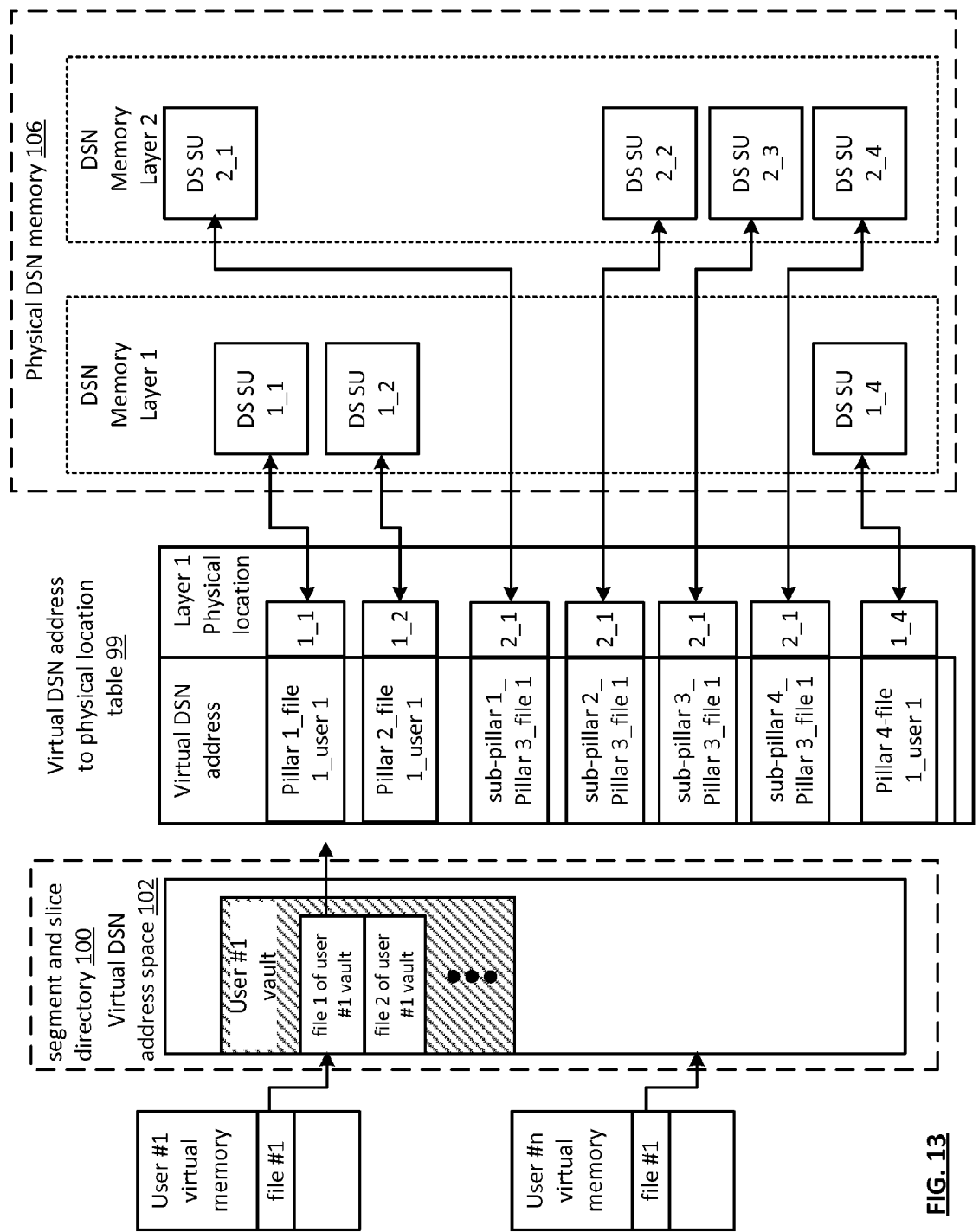
FIG. 13 is a schematic block diagram of another embodiment of a file system hierarchy in accordance with the invention.

FIG. 13 is a schematic block diagram of another embodiment of a file system hierarchy that is similar to FIG. 9, with the exception of what is in the virtual DSN address to physical location table 99. In this Figure, the DS processing module 38 generates the sub-slices and maintains the virtual DSN address to physical location mapping of the slices and the sub-slices in table 99. As shown, the table 99 includes a column for the virtual DSN address that corresponds to a pillar (e.g., 1, 2, and 4 for the slices and pillars 1-4 for the sub-slices) and a column for the physical layer location (e.g., the identity of a DS storage unit 1_1, 1_2, and 1_4 for the slices and 2_1 through 2_4 for the sub-slices).

Figure 14:
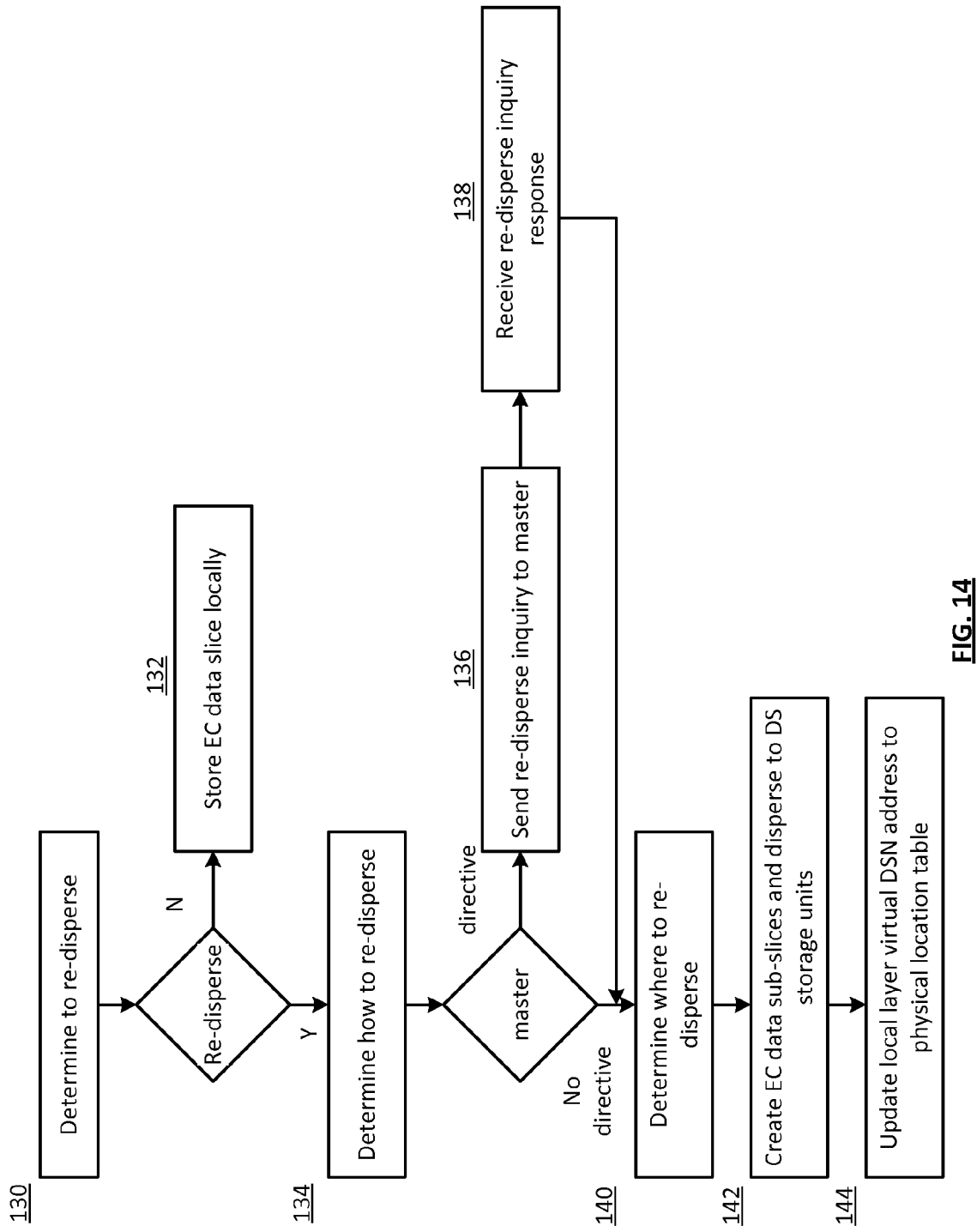
FIG. 14 is a logic diagram of another embodiment of a method for storage dispersion in accordance with the present invention.

FIG. 14 is a logic diagram of another embodiment of a method for storage dispersion that may be executed by a DS storage unit. The method begins at step 130 where the DS storage unit receives an EC data slice (or sub-slice, etc.) and determines whether to re-disperse (i.e., sub-slice) the EC data slice. The determination may be based on one or more of DSN memory is not available (e.g., the DS Processing module has partitioned less DSN memory, or DSN memory is nearly full), the user ID, the vault ID, a priority level of the EC data slice, the type of data in the EC data slice, a command from a parent level DSN memory level, a command from the DS processing module, and/or any other variable to improve memory performance.

When the slice (or sub-slice) is not to be sub-sliced, the method continues at step 132 where the DS storage unit stores the EC data slice locally and updates its local storage location table. If, however, the slice (or sub-slice) is to be sub-sliced, the method continues at step 134 where the DS storage unit determines the sub-slicing encoding function (e.g., how to re-disperse). Such a determination may be based on instructions included with the EC data slice, the user ID, the vault ID, a priority level of the EC data slice, the type of data in the EC data slice, a command from a parent level DSN memory level, a command for the DS processing module, and/or any other variable to improve memory performance.

The method branches based on whether the DS storage unit seeks help in determining how to re-disperse (e.g., sub-slice). If help is sought, the method continues at step 136 where the DS storage unit sends a re-disperse inquiry to a master DS processing module 38 (e.g., the DS processing unit that started the initial dispersion). The method continues at step 138 where the DS storage unit receives a re-disperse response that indicates re-dispersion guidance (e.g., which DS storage units to store the sub-slices, what error coding and/or IDA to use to create the sub-slices, etc.).

If the DS processing module does not respond because help was not sought or it failed to respond, the method continues at step 140 where the DS storage unit determines the re-dispersion parameters. The method continues at step 142 where the DS storage creates EC data sub-slices. The method continues at step 144 where the DS storage unit updates its local layer virtual DSN address to physical location table with the identity of the EC data sub-slices and the corresponding DS storage units.

Figure 15:
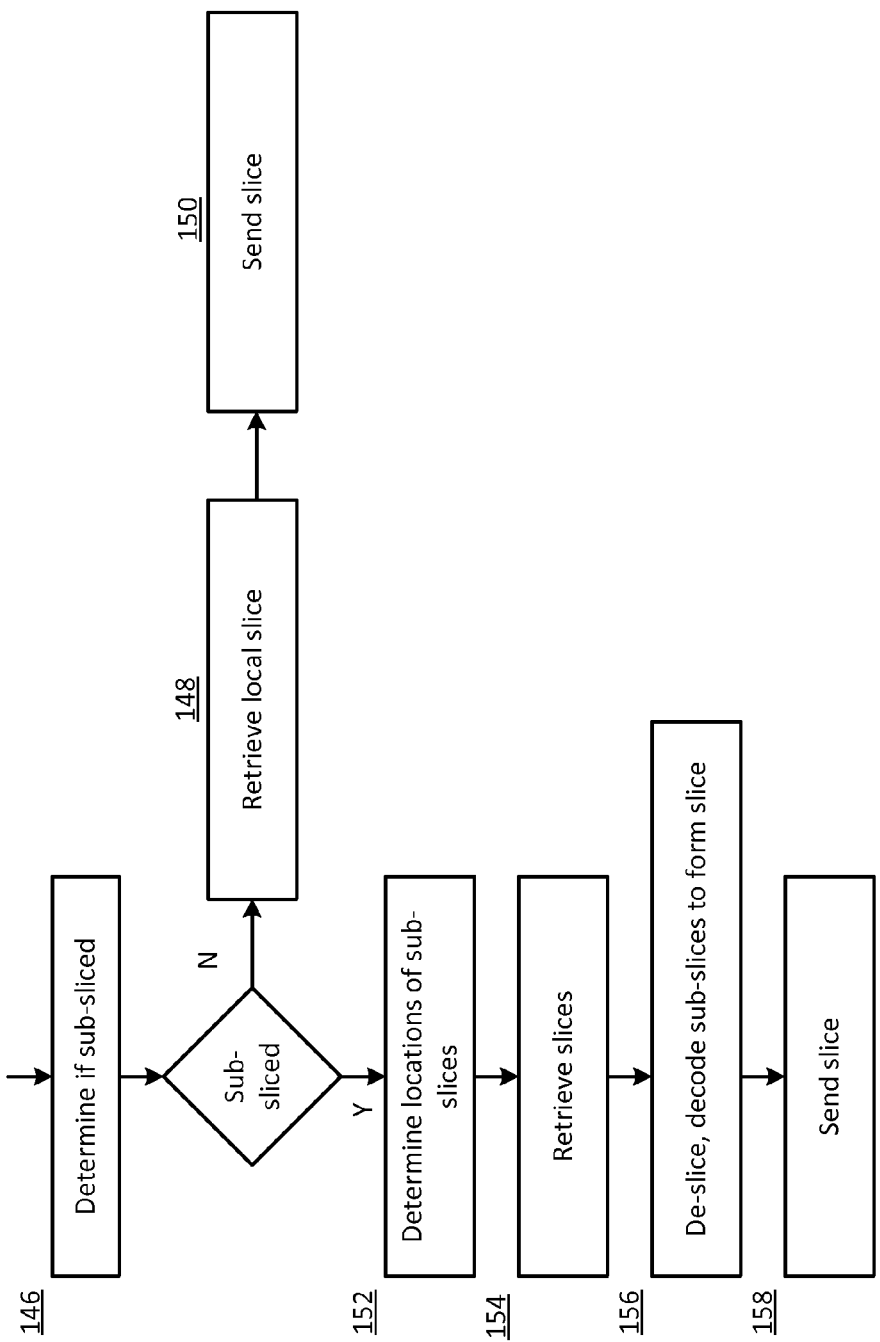
FIG. 15 is a logic diagram of another embodiment of a method for storage dispersion in accordance with the present invention.

FIG. 15 is a logic diagram of another embodiment of a method for storage dispersion that may be executed by a DS storage unit. The method begins at step 146 where the DS storage unit retrieves an EC data slice in response to a request from a higher level requester (e.g., a higher layer DS storage unit or the DS processing module) and determines whether the requested EC data slice was sub-sliced. If not, the method continues at step 148 where the DS storage unit retrieves the EC data slice 148 from its local memory. The method then continues at step 150 where the DS storage unit sends the EC data slice to the higher level requester.

If the requested EC data slice was sub-sliced, the method continues at step 152 where the DS storage unit determines the locations of the EC data sub-slices. The determination may be based on the local storage location table or the virtual DSN address to physical location table for this DSN memory layer. The method continues at step 154 where the DS storage unit retrieves the EC data sub-slices from the identified DS storage units. The method continues at step 156 where the DS storage unit de-slices and decodes at least a read threshold of the EC data sub-slices to produce the EC data slice. The method continues at step 158 where the DS storage unit sends the EC data slice to the higher level requester.

Figure 16:
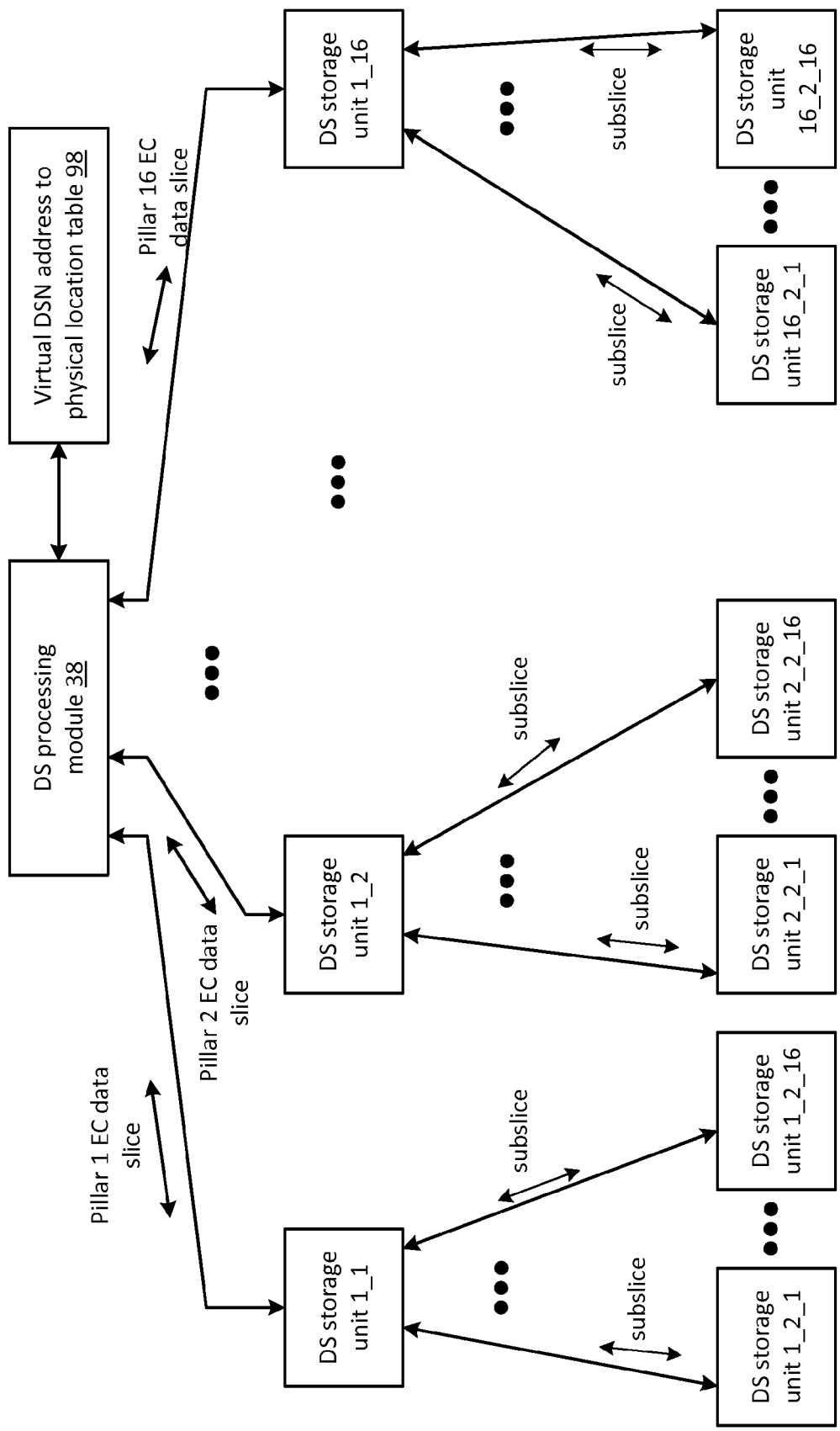
FIG. 16 is a schematic block diagram of another embodiment of a dispersed storage network storage system in accordance with the invention.

FIG. 16 is a schematic block diagram of another embodiment of a dispersed storage network storage system that includes the DS processing module 38, the virtual DSN address to physical location table 98, DSN storage units 1_1 through 1_16 (DSN memory layer 1), DS storage units 1_2_1 through 1_2_16 (part of DSN memory layer 2), DS storage units 2_2_1 through 2_2_16 (part of DSN memory layer 2), and similar sets of DS storage unit up through DS storage units 16_2_1 through 16_2_16 (part of DSN memory layer 2). In this example, each of the sixteen layer 1 DS storage units re-disperses to sixteen more DS storage units at layer 2. For example, DS storage unit 1_1 re-disperses in a sixteen pillar coding method to DS storage units 1_2_1 through 1_2_16, and DS storage unit 1_16 re-disperses in a sixteen pillar coding method to DS storage units 16_2_1 through 16_2_16.

This storage system may provide higher levels of reliability as each of the sixteen wide layer 1 pillars are re-dispersed to sixteen wide pillars of dispersed storage at DSN memory layer 2. The storage and retrieval may operate as described earlier. The DSN memory layer 1 DS storage units may simultaneously store the EC data slice and re-disperse it to DSN memory layer 2 to provide both speed of retrieval and high reliability. For example, the layer 1 DS storage unit may locally store the EC data slice from the DS processing module 38 to enable higher speed retrieval and the layer 1 DS storage unit may re-disperse the EC data slice as EC data sub-slices to layer 2 DS storage units to enable high reliability. The layer 1 DS storage unit may send the locally stored EC data slice to the DS processing unit in response to a retrieval request when the EC data slice is stored locally on the layer 1 DS storage unit. The layer 1 DS storage unit may retrieve EC data sub-slices from the threshold of layer 2 DS storage units to re-create the EC data slice to send to the DS processing unit in response to a retrieval request when the EC data slice is not stored, missing, or corrupted locally on the layer 1 DS storage unit.

FIG. 17 is a logic diagram of another embodiment of a method for storage dispersion that may be executed by the DS processing module within the user device and/or within the DS processing unit. The method begins at step 160 where the DS processing module generates a plurality of encoded slices from a data segment using an error encoding function. The method continues at step 162 where the DS processing module identifies a plurality of DS storage units for storing the plurality of encoded slices. The method continues at step 164 where the DS processing module selects an encoded slice of the plurality of encoded slices for sub-slicing using a sub-slicing encoding function to produce a selected encoded slice.

As an example, the selection of the encoded slice may be done by determining a security threshold for the plurality of encoded slices based on a read threshold of the error encoding function. For example, in a 16 wide encoding scheme and a read threshold of 10, the security threshold may be 7 or more such that at least one slice of the read threshold is sub-sliced. Once the security threshold is established, the encoded slice, or slices, is selected. As another example, the selecting of the encoded slice may be based on a retrieval latency for each of the plurality of DS storage units, a priority of the selected encoded slice, a data type of the data segment, availability of each of the plurality of DS storage units, and/or cost of storing an encoded slice in the DS storage units.

The method continues at step 166 where the DS processing module outputs the plurality of encoded slices to the plurality of DS storage units. The method continues at step 168 where the DS processing module outputs a command to a DS storage unit of the plurality of DS storage units corresponding to the selected encoded slice, wherein the command includes an instruction to sub-slice the selected encoded slice. Note that the command may further include at least one of: an instruction to send at least one of a plurality of encoded sub-slices for further sub-slicing, wherein the plurality of encoded sub-slices is generated by encoding the selected encoded slice using the sub-slicing encoding function; an instruction for storing a plurality of encoded sub-slices in a second plurality of DS storage units, wherein the plurality of encoded sub-slices is generated by encoding the selected encoded slice using the sub-slicing encoding function; and an instruction to use one of a plurality of sub-slicing encoding functions as the sub-slicing encoding function, wherein the plurality of sub-slicing encoding functions includes the error encoding function.

While not shown in FIG. 17, the method may further include the DS processing module maintaining a list of the DS storage units for storing the plurality of encoded slices less the selected encoded slice and the DS storage unit associated with the selected encoded slice for sub-slicing. The list may be updated by receiving, from the DS storage unit, information regarding the sub-slicing encoding function, information regarding the plurality of encoded sub-slices, and information regarding a second plurality of DS storage units identified for storing the plurality of encoded sub-slices.

The method of FIG. 17 may further include a step where the DS processing module outputs a second command to the plurality of DS storage units less the DS storage unit. The second command includes an instruction not to perform a sub-slicing encoding function on a corresponding one of the plurality of encoded slices.

FIG. 18 is a logic diagram of another embodiment of a method for storage dispersion that may be executed by the DS processing module. The method begins at step 170 where the DS processing module generates a plurality of encoded slices from a data segment using an error encoding function. The method continues at step 172 where the DS processing module selects an encoded slice of the plurality of encoded slices for sub-slicing to produce a selected encoded slice.

As an example, the selection of the encoded slice may be done by determining a security threshold for the plurality of encoded slices based on a read threshold of the error encoding function. For example, in a 16 wide encoding scheme and a read threshold of 10, the security threshold may be 7 or more such that at least one slice of the read threshold is sub-sliced. Once the security threshold is established, the encoded slice, or slices, is selected. As another example, the selecting of the encoded slice may be based on a retrieval latency for each of the plurality of DS storage units, a priority of the selected encoded slice, a data type of the data segment, availability of each of the plurality of DS storage units, and/or cost of storing an encoded slice in the DS storage units.

The method continues at step 174 where the DS processing module generates a plurality of encoded sub-slices from the selected encoded slice using a sub-slicing encoding function. For example, the DS processing module may select a sub-slicing encoding function from a plurality of sub-slicing encoding functions to produce a selected sub-slicing encoding function, wherein the plurality of sub-slicing encoding functions includes the error encoding function. Having made the selection, the DS processing module generates the plurality of encoded sub-slices from the selected encoded slice using the selected sub-slicing encoding function.

The method continues at step 176 where the DS processing module outputs the plurality of encoded slices, less the selected encoded slice, to a first plurality of DS storage units. The method continues at step 178 where the DS processing module outputs the plurality of encoded sub-slices to a second plurality of DS storage units. An example of these steps is provided in FIGS. 12 and 13.

While not shown in FIG. 18, the method may further includes a step where the DS processing module selects an encoded sub-slice of the plurality of encoded sub-slices for further sub-slicing to produce a selected encoded sub-slice. The method may include another step where the DS processing module generated a plurality of encoded further sub-slices (e.g., sub-sub-slices) from the selected encoded sub-slice using the sub-slicing encoding function. The method may include another step where the DS processing module outputs the plurality of encoded sub-slices, less the selected encoded sub-slice, to the second plurality of DS storage units. The method may include another step where the DS processing module outputs the plurality of encoded further sub-slices to the second plurality of DS storage units.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/ or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method comprises:
    segmenting, by a dispersed storage (DS) processing module, a data object into data segments;
    encoding, by the dispersed storage (DS) processing module and in accordance with a dispersed storage error encoding function, the data segments to produce a plurality of encoded data slices including slice names;
    outputting, by the DS processing module, the plurality of encoded data slices to storage units of a dispersed storage network (DSN);
    receiving, by one of the storage units, an encoded slice of the plurality of encoded slices;
    determining, by the one of the storage units, whether the received encoded slice is to be sub-sliced using a sub-slicing error encoding function upon receiving a command to generate a plurality of encoded sub-slices;
    when the encoded slice is to be sub-sliced, encoding, by the one of the storage units and in accordance with the sub-slicing error encoding function, the encoded slice to produce a plurality of encoded sub-slices; and
    outputting, by the one of the storage units, the plurality of encoded sub-slices to a set of storage units.

2. The method of claim 1, wherein the outputting the plurality of encoded sub-slices further comprises:
    outputting the plurality of encoded sub-slices to the set of storage units, wherein the set of storage units includes at least one of the storage units.

3. The method of claim 1, wherein the determining whether the encoded slice is to be sub-sliced further comprises:
    determining to sub-slice the encoded slice based on at least one of:
        retrieval latency for each of the set of storage units;
        priority of the encoded slice;
        a data type of the data segment;
        availability of each of the set of storage units; and
        cost of storing an encoded sub-slice of the plurality of encoded sub-slices in each of the set of storage units.

4. The method of claim 1 further comprises:
    selecting one of a plurality of sub-slicing error encoding functions as the sub-slicing encoding function, wherein the plurality of sub-slicing error encoding functions includes the error encoding function.

5. The method of claim 1 further comprises:
    maintaining a list of the set of storage units storing the plurality of encoded sub-slices.

6. The method of claim 5 further comprises:
    sending the list to the DS processing module.

7. The method of claim 1 further comprises at least one of:
    outputting a command with an encoded sub-slice of the plurality of encoded sub-slices to enable further sub-slicing of the encoded sub-slice; and
    outputting a command with at least one of the plurality of encoded sub-slices to prohibit further sub-slicing of the at least one of the plurality of encoded sub-slices.

8. A non-transitory computer readable storage device comprises:
    a first section for storing operational instructions that, when executed by a dispersed storage (DS) processing module, causes the DS processing module to:
        segment a data object into data segments;
        encode, in accordance with a dispersed storage error encoding function, the data segments to produce a plurality of encoded data slices including slice names;
        output, via a computing device interface, the plurality of encoded data slices to storage units of a dispersed storage network (DSN);
    a second section for storing operational instructions that, when executed by one of the storage units, causes the one of the storage units to:
        receive an encoded slice of the plurality of encoded slices;
        determine whether the encoded slice is to be sub-sliced using a sub-slicing error encoding function upon receiving a command via the computing device interface to generate a plurality of encoded sub-slices;

when the encoded slice is to be sub-sliced, encode, in accordance with the sub-slicing error encoding function, the encoded slice to produce a plurality of encoded sub-slices; and output at least some of the plurality of encoded sub-slices to a plurality of storage units;

outputting, by the one of the storage units, the plurality of encoded sub-slices to a set of storage units.

9. The non-transitory computer readable storage device of claim 8, wherein the second section further comprises operational instructions that, when executed by the one of the storage units, causes the one of the storage units to output the plurality of encoded sub-slices by:

outputting the plurality of encoded sub-slices to the set of storage units, wherein the set of storage units includes at least one of the storage units.

10. The non-transitory computer readable storage device of claim 8, wherein the second section further comprises operational instructions that, when executed by the one of the storage units, causes the one of the storage units to determine whether the encoded slice is to be sub-sliced further by:

determining to sub-slice the encoded slice based on at least one of:
retrieval latency for each of the plurality of storage units;
priority of the encoded slice;
a data type of the data segment;
availability of each of the set of storage units; and
cost of storing an encoded sub-slice of the plurality of encoded sub-slices in each of the set of storage units.

11. The non-transitory computer readable storage device of claim 8, wherein the second section further comprises operational instructions that, when executed by the one of the storage units, causes the one of the storage units to:

select one of a plurality of sub-slicing error encoding functions as the sub-slicing error encoding function, wherein the plurality of sub-slicing error encoding functions includes the error encoding function.

12. The non-transitory computer readable storage device of claim 8, wherein the second section further comprises operational instructions that, when executed by the one of the storage units, causes the one of the storage units to:

maintain a list of the set of storage units storing the plurality of encoded sub-slices in a memory.

13. The non-transitory computer readable storage device of claim 8, wherein the second section further comprises operational instructions that, when executed by the one of the storage units, causes the one of the storage units to:

send list to the DS processing module.

14. The non-transitory computer readable storage device of claim 8, wherein the second section further comprises operational instructions that, when executed by the one of the storage units, causes the one of the storage units to at least one of:

generate a first command to enable further sub-slicing of the encoded sub-slice; and generate a second command to prohibit further sub-slicing of the encoded sub-slice.

15. A method comprises:

segmenting, by a dispersed storage (DS) processing module, a data object into data segments;

encoding, by the dispersed storage (DS) processing module and in accordance with a dispersed storage error encoding function, the data segments to produce a plurality of encoded data slices;

outputting, by the DS processing module, the plurality of encoded data slices to storage units of a dispersed storage network (DSN);

receiving, by one of the storage units, an encoded slice of the plurality of encoded slices;

determining, by the one of the storage units, whether the encoded slice is to be sub-sliced using a sub-slicing error encoding function;

when the encoded slice is to be sub-sliced, encoding, by the one of the storage units and in accordance with the sub-slicing error encoding function, the encoded slice to produce a plurality of encoded sub-slices;

outputting a command with an encoded sub-slice of the plurality of encoded sub-slices to enable further sub-slicing of the encoded sub-slice; and outputting, by the one of the storage units, the plurality of further sub-sliced encoded sub-slices to a set of storage units.

16. The method of claim 15 further comprising outputting a command with at least one of the plurality of encoded sub-slices to prohibit further sub-slicing of the at least one of the plurality of encoded sub-slices.

17. The method of claim 15, wherein the determining whether the encoded slice is to be sub-sliced further comprises:

receiving a command to generate the plurality of encoded sub-slices.

18. The method of claim 15, wherein the determining whether the encoded slice is to be sub-sliced further comprises:

determining to sub-slice the encoded slice based on at least one of:
retrieval latency for each of the set of storage units;
priority of the encoded slice;
a data type of the data segment;
availability of each of the set of storage units; and
cost of storing an encoded sub-slice of the plurality of encoded sub-slices in each of the set of storage units.

* * * * *